United States Patent
Sol et al.

(10) Patent No.: US 9,619,648 B2
(45) Date of Patent: Apr. 11, 2017

(54) BEHAVIOR CHANGE DETECTION SYSTEM FOR SERVICES

(71) Applicant: Microsoft Technology Licensing, LLC, Redmond, WA (US)

(72) Inventors: Alisson Augusto Souza Sol, Bellevue, WA (US); Dragos D. Boia, Seattle, WA (US); Barry Markey, Kirkland, WA (US); Robert D. Fish, Seattle, WA (US); Donald J. Ankney, Seattle, WA (US); Viresh Ramdatmisier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/519,062

(22) Filed: Oct. 20, 2014

(65) Prior Publication Data
US 2016/0019387 A1 Jan. 21, 2016

Related U.S. Application Data

(63) Continuation-in-part of application No. 14/333,377, filed on Jul. 16, 2014.

(51) Int. Cl.
| | |
|---|---|
| *G06F 11/00* | (2006.01) |
| *G06F 21/55* | (2013.01) |
| *G06F 21/57* | (2013.01) |
| *H04L 29/06* | (2006.01) |

(52) U.S. Cl.
CPC .......... *G06F 21/552* (2013.01); *G06F 21/577* (2013.01); *H04L 63/1416* (2013.01); *H04L 63/1425* (2013.01); *G06F 2221/034* (2013.01)

(58) Field of Classification Search
CPC .............. H04L 63/1416; H04L 63/145; G06F 2201/86; G06F 2201/865; G06F 2201/87; G06F 2201/875
USPC .......................................................... 726/23
See application file for complete search history.

(56) References Cited

U.S. PATENT DOCUMENTS

| | | | |
|---|---|---|---|
| 6,801,503 | B1 | 10/2004 | Wetherall |
| 7,058,015 | B1 | 6/2006 | Wetherall et al. |
| 7,159,237 | B2 | 1/2007 | Schneier et al. |
| 7,359,930 | B2 | 4/2008 | Jackson et al. |

(Continued)

FOREIGN PATENT DOCUMENTS

| | | |
|---|---|---|
| CA | 2452285 | 1/2003 |
| EP | 1348285 | 1/2003 |

(Continued)

OTHER PUBLICATIONS

Said Assar, A Behavioral Perspective in Meta-modeling, Jul. 2011.*

(Continued)

*Primary Examiner* — Samson Lemma
(74) *Attorney, Agent, or Firm* — Lee & Hayes, PLLC

(57) ABSTRACT

A behavior change detection system collects behavior from a service, such as an online service, and detects behavior changes, either permanent or transient, in the service. Machine learning hierarchical (agglomerative) clustering techniques are utilized to compute deviations between clustered data sets representing an "answer" that the service presents to a series of requests.

14 Claims, 19 Drawing Sheets

(56) References Cited

U.S. PATENT DOCUMENTS

| | | |
|---|---|---|
| 7,424,619 B1 | 9/2008 | Fan et al. |
| 7,444,404 B2 | 10/2008 | Wetherall et al. |
| 7,475,141 B1 | 1/2009 | Anderson et al. |
| 7,529,192 B2 | 5/2009 | Labovitz |
| 7,596,807 B2 | 9/2009 | Ptacek et al. |
| 7,603,715 B2 | 10/2009 | Costa et al. |
| 7,634,812 B2 | 12/2009 | Costa et al. |
| 7,634,813 B2 | 12/2009 | Costa et al. |
| 7,690,037 B1 | 3/2010 | Hartmann |
| 7,730,531 B2 | 6/2010 | Walsh |
| 7,774,459 B2 | 8/2010 | Wang et al. |
| 7,779,304 B2 * | 8/2010 | Jennings ............. G06F 11/0727 714/38.14 |
| 7,841,007 B2 | 11/2010 | Currie et al. |
| 7,844,696 B2 | 11/2010 | Labovitz et al. |
| 7,970,886 B1 | 6/2011 | Wetherall et al. |
| 8,001,271 B1 | 8/2011 | Malan et al. |
| 8,103,755 B2 | 1/2012 | Malan et al. |
| 8,112,546 B2 | 2/2012 | Razmov et al. |
| 8,136,029 B2 | 3/2012 | Jagdale et al. |
| 8,146,160 B2 | 3/2012 | Orr et al. |
| 8,266,698 B1 | 9/2012 | Seshardi et al. |
| 8,271,678 B2 | 9/2012 | Wetherall et al. |
| 8,291,499 B2 | 10/2012 | Aziz et al. |
| 8,312,536 B2 | 11/2012 | Nachenberg et al. |
| 8,365,290 B2 | 1/2013 | Young |
| 8,370,929 B1 | 2/2013 | Pennington et al. |
| 8,370,939 B2 | 2/2013 | Zaitsev et al. |
| 8,424,072 B2 | 4/2013 | Pullikottil et al. |
| 8,463,901 B2 | 6/2013 | Caram |
| 8,509,086 B2 | 8/2013 | Anderson et al. |
| 8,549,139 B2 | 10/2013 | Labovitz et al. |
| 8,555,391 B1 | 10/2013 | Demir et al. |
| 8,566,935 B2 | 10/2013 | Lagar-Cavilla et al. |
| 8,572,735 B2 | 10/2013 | Ghosh et al. |
| 8,578,494 B1 | 11/2013 | Engler et al. |
| 8,595,176 B2 | 11/2013 | Wang et al. |
| 8,595,837 B2 | 11/2013 | Antony et al. |
| 8,661,522 B2 | 2/2014 | Huston, III et al. |
| 8,667,047 B2 | 3/2014 | Jackson et al. |
| 9,083,729 B1 | 7/2015 | Doshi et al. |
| 2002/0107960 A1 | 8/2002 | Wetherall et al. |
| 2002/0143980 A1 | 10/2002 | Wetherall et al. |
| 2003/0002436 A1 | 1/2003 | Anderson et al. |
| 2003/0037136 A1 | 2/2003 | Iekel-Johnson et al. |
| 2003/0131100 A1 | 7/2003 | Godon et al. |
| 2004/0004941 A1 | 1/2004 | Langhorst et al. |
| 2004/0103211 A1 | 5/2004 | Dysart et al. |
| 2004/0111708 A1 * | 6/2004 | Calder ................ G06F 11/3466 717/131 |
| 2004/0193918 A1 | 9/2004 | Green et al. |
| 2005/0005017 A1 | 1/2005 | Ptacek et al. |
| 2005/0018602 A1 | 1/2005 | Labovitz |
| 2005/0018608 A1 | 1/2005 | Wetherall |
| 2005/0216956 A1 | 9/2005 | Orr et al. |
| 2007/0094491 A1 | 4/2007 | Teo et al. |
| 2008/0059544 A1 | 3/2008 | Rahim |
| 2008/0184371 A1 | 7/2008 | Moskovitch et al. |
| 2009/0168648 A1 | 7/2009 | Labovitz et al. |
| 2009/0313699 A1 | 12/2009 | Jang et al. |
| 2010/0177943 A1 | 7/2010 | Zhao et al. |
| 2011/0023115 A1 | 1/2011 | Wright |
| 2011/0283361 A1 | 11/2011 | Perdisci et al. |
| 2011/0296002 A1 | 12/2011 | Caram |
| 2011/0296005 A1 | 12/2011 | Labovitz et al. |
| 2012/0047248 A1 | 2/2012 | Makhija |
| 2012/0096551 A1 | 4/2012 | Lee et al. |
| 2012/0124087 A1 | 5/2012 | Malan et al. |
| 2012/0167168 A1 | 6/2012 | Orr et al. |
| 2012/0222119 A1 | 8/2012 | Huston |
| 2013/0031605 A1 | 1/2013 | Huston III et al. |
| 2013/0055374 A1 | 2/2013 | Kustarz et al. |
| 2013/0055375 A1 | 2/2013 | Cline et al. |
| 2013/0111019 A1 | 5/2013 | Tjew et al. |
| 2013/0198119 A1 | 8/2013 | Eberhardt, III et al. |
| 2013/0263259 A1 | 10/2013 | Huston, III et al. |
| 2014/0059199 A1 | 2/2014 | Do et al. |
| 2014/0090061 A1 | 3/2014 | Avasarala et al. |
| 2014/0113588 A1 | 4/2014 | Chekina et al. |
| 2014/0149312 A1 | 5/2014 | Jennings et al. |
| 2014/0149806 A1 | 5/2014 | Khalastchi et al. |
| 2014/0317734 A1 | 10/2014 | Valencia et al. |
| 2015/0106927 A1 | 4/2015 | Ferragut et al. |
| 2015/0286820 A1 | 10/2015 | Sridhara et al. |
| 2015/0304349 A1 | 10/2015 | Bernstein et al. |
| 2016/0021124 A1 | 1/2016 | Sol et al. |

FOREIGN PATENT DOCUMENTS

| | | |
|---|---|---|
| GB | 2393607 | 3/2004 |
| GB | 2411315 | 8/2005 |
| WO | WO0223808 | 3/2002 |
| WO | WO-03001333 | 1/2003 |
| WO | WO-03003210 | 1/2003 |
| WO | WO-2004049627 | 6/2004 |
| WO | WO-2005006710 | 1/2005 |
| WO | WO-2013032774 | 3/2013 |
| WO | WO-2013032775 | 3/2013 |
| WO | WO-2013113532 | 8/2013 |

OTHER PUBLICATIONS

Terran Lane; "Machine Learning Techniques for the Domain of Anomaly Detection for Computer Security" Purdue University, Jul. 16, 1998.*

Broadwell, "Response Time as a Performability Metric for Online Services", Technical Report No. UCB//CSD-04-1324, May 2004, 54 pages.

Brown, "Working with SEC—The Simple Event Correlator", Retrieved From: <http://simple-evcorr.sourceforge.net/SEC-tutorial/article.html> Apr. 24, 2014, Nov. 23, 2003, 29 Pages.

Brown, "Working with SEC—the Simple Event Correlator, Part Two", Retrieved From: <http://simple-evcorr.sourceforge.net/SEC-tutorial/article-part2.html> Apr. 24, 2014, Jul. 24, 2004, 27 Pages.

Chavan, et al., "Adaptive Neuro-Fuzzy Intrusion Detection Systems", Proceedings of the International Conference on Information Technology: Coding and Computing, vol. 1, Apr. 5, 2004, 5 pages.

Dass, et al., "LIDS: Learning Intrusion Detection System", Proceedings of the Sixteenth International Florida Artificial Intelligence Research Society Conference, May 12, 2003, pp. 12-16.

Mukkamala, et al., "Intrusion Detection Using Neural Networks and Support Vector Machines", in Proceedings: The International Joint Conference on Neural Networks, vol. 2, May 12, 2002, pp. 1702-1707.

Reavey, et al., "Operational Security for Online Services Overview", Available at: <http://download.microsoft.com/download/9/D/B/9DBA2020-5E81-4A54-8C5D-4938B0FAE042/Operational-Security-for-Online-Services-Overview.pdf>, Oct. 21, 2013, 10 Pages.

Rouillard, "Real-Time Log File Analysis using the Simple Event Correlator (SEC)", in Proceedings of the 18th USENIX conference on System Administration, Nov. 14, 2004, 18 Pages.

Stroeh, et al., "An Approach to the Correlation of Security Events based on Machine Learning Techniques", Available at: <http://download.springer.com/static/pdf/373/art%253A10.1186%252F1869-0238-4-7.pdf?auth66=1398335730_1698f19e7e31ee8e249648320b49dba7&ext=.pdf>, Mar. 2013, 16 Pages.

Turnbull, "Hardening Linux—Understanding Logging and Monitoring", in Proceedings: Apress, 1 edition, Jan. 25, 2005, 48 Pages.

Vaarandi, "SEC—A Lightweight Event Correlation Tool", in Proceedings: IEEE Workshop on IP Operations and Management, Oct. 29, 2002, 5 Pages.

Vaarandi, "SEC—Simple Event Correlator", Retrieved From: <http://simple-evcorr.sourceforge.net/> Apr. 22, 2014, Jan. 15, 2014, 2 pages.

Vaarandi, "Simple Event Correlator for Real-Time Security Log Monitoring", in Proceedings: Hakin9 Magazine, Jan. 1, 2006, 4 Pages.

(56) References Cited

OTHER PUBLICATIONS

Vaarandi, "SLCT—Simple Logfile Clustering Tool", Retrieved From: <http://ristov.users.sourceforge.net/slct/> Apr. 24, 2014, Jan. 20, 2010, 1.

Vaarandi, et al., "Security Event Processing with Simple Event Correlator", in Proceedings: Journal of ISSA, Aug. 2012, 8 pages.

Ye, "A Markov Chain Model of Temporal Behavior for Anomaly Detection", in Proceedings: The IEEE Workshop on Information Assurance and Security, Jun. 6, 2000, 4 Pages.

Dedhia,"Bitdefender 60-Second Virus Scanner Review", Retrieved From: <http://www.blogsdna.com/20005/bitdefender-60-second-virus-scanner.htm> Mar. 11, 2015, Jan. 3, 2013, 5 pages.

"International Search Report & Written Opinion Issued in PCT Application No. PCT/US2015/040086", Mailed Date: Oct. 21, 2015, 12 Pages.

Office action for U.S. Appl. No. 14/333,377, mailed on Jan. 21, 2016, Sol et al., "Volatility-based Classifier for Security Solutions", 13 pages.

PCT Search Report and Written Opinion mailed Oct. 21, 2015 for PCT application No. PCT/US2015/040083, 12 pages.

\* cited by examiner

```
<MetaDomainsDescriptor>
<Domain Name="bing">
<TopLevelDomain>bing.com</TopLevelDomain>
<Object Name="algo results">
<Extractor Operator="UnionAll">
<xPath><![CDATA[//li[@class='algo_results']]></xPath>
</Extractor>
<Feature Name="algo results instances info">
<Action>CountInstances</Action>
<Action>GetInstancesOrder</Action>
</Feature>
<Feature Name="algo results color and position">
<Action>GetColor</Action>
<Action>GetPagePosition</Action>
</Feature>
</Object>
</Domain>
</MetaDomainsDescriptor>
```

Fig. 2a

```
<Matrices>
<MatrixExecution Name="bing matrix execution">
  <EndPoint>
    <![CDATA[http://www.bing.com/search?q=##query##&mkt=##market##]]>
  </EndPoint>
</MatrixExecution>
<!-- Cross join parameters -->
<Parameters>
  <Parameter Name="query">
    <Value>microsoft</Value>
    <Value>johann sebastian bach</Value>
  </Parameter>
  <Parameter Name="market">
    <Value>en-US</Value>
    <Value>en-GB</Value>
  </Parameter>
</Parameters>
</Matrices>
```

Fig. 2b

BEHAVIOR CHANGE DETECTION SYSTEM FOR SERVICES

RELATED APPLICATION

This application is a continuation-in-part of, and claims priority to U.S. patent application Ser. No. 14/333,377, filed on Jul. 16, 2014, the disclosure of which is incorporated by reference herein.

BACKGROUND

Organizations with a large number of computers that run several different services typically monitor both hardware and software events for anomalies that can indicate security threats. To date, operational security assurance procedures are typically based on rules that analyze events for pre-defined patterns. For example, the rules may be run against logs of each computer. The pre-defined patterns can indicate a potential security threat which, once identified, can be addressed. This rule-based approach can fail to scale in at least two dimensions, thus rendering the approach difficult to flexibly implement. First, regarding rule-based implementations, such requires coding of the rules ahead of time, based on expert knowledge. This means that rule developers have to anticipate what is sought as a vulnerability. Rule developers may not, however, be knowledgeable of all potential vulnerabilities, thus leaving gaps in the approach. Second, during operation, the rule-based approach demands full scanning of all events, seeking for patterns in data or information that may have incomplete or incorrect data.

Thus, it can be difficult to achieve good or satisfactory results because such systems can typically fail to either recognize important security events, or can produce too many false positives, thus triggering unnecessary investigations.

SUMMARY

This Summary is provided to introduce a selection of concepts in a simplified form that are further described below in the Detailed Description. This Summary is not intended to identify key features or essential features of the claimed subject matter.

Various embodiments provide an approach to classifying security events based on the concept of behavior change detection or "volatility." Behavior change detection is utilized, in place of a pre-defined patterns approach, to look at a system's behavior and detect any variances from what would otherwise be normal operating behavior. In operation, machine learning techniques are utilized as an event classification mechanism which facilitates implementation scalability. The machine learning techniques are iterative and continue to learn over time. Operational scalability issues are addressed by using the computed volatility of the events in a time series as input for a classifier. During a learning process (i.e., the machine learning process), the system identifies relevant features that are affected by security incidents. When in operation, the system evaluates those features in real-time and provides a probability that an incident is about to occur.

In at least some embodiments, a behavior change detection system collects behavior from a service, such as an online service, and detects behavior changes, either permanent or transient, in the service. Machine learning hierarchical (agglomerative) clustering techniques are utilized to compute deviations between clustered data sets representing an "answer" that the service presents to a series of requests.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

FIG. 2a illustrates modeling a domain metadescriptor as xml data in accordance with one embodiment.

FIG. 2b illustrates modeling a matrix execution as xml data in accordance with one embodiment.

DETAILED DESCRIPTION

Overview

Figure 1:
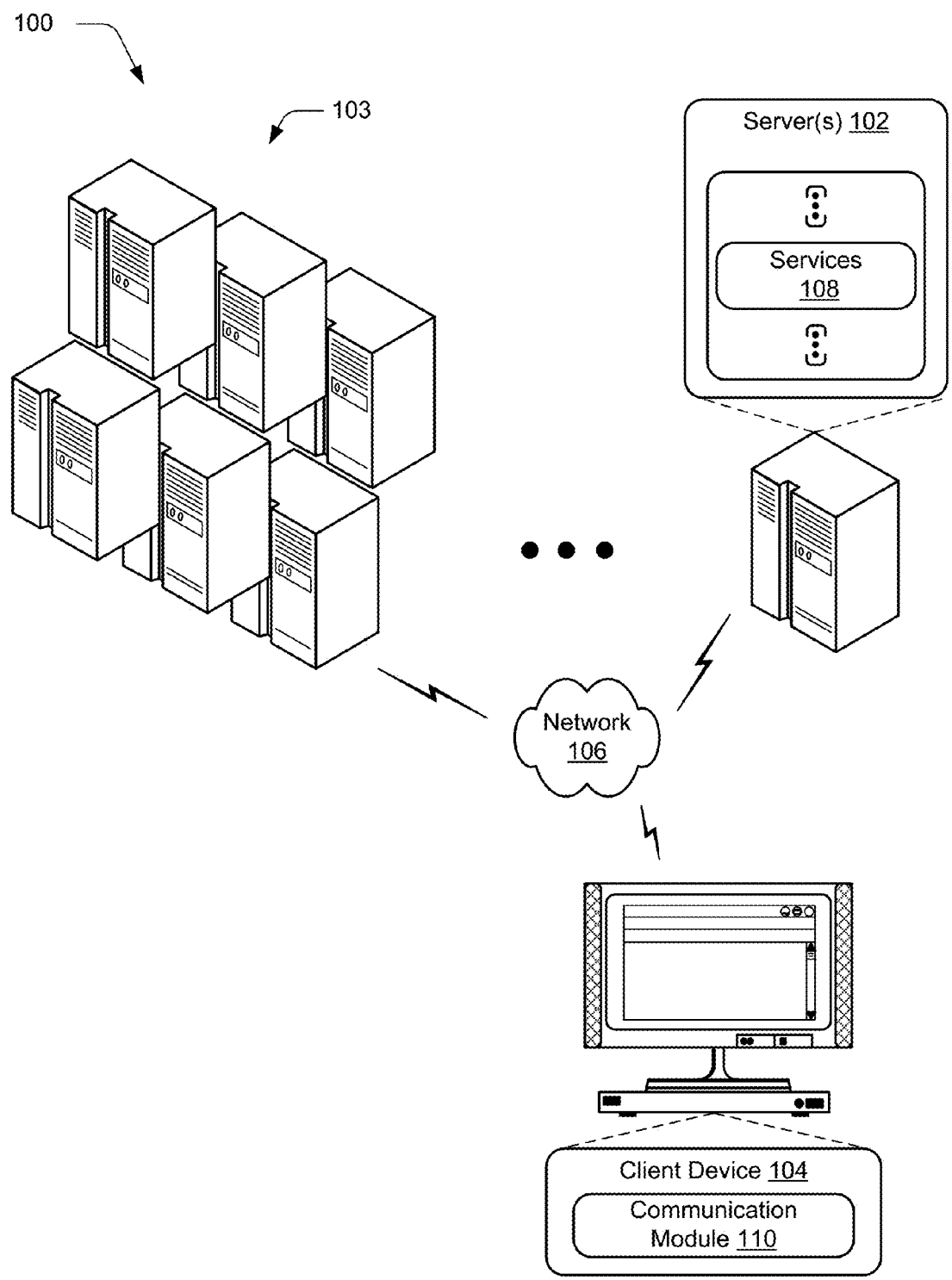
FIG. 1 illustrates an example operating environment in accordance with one or more embodiments.

Various embodiments provide an approach to classifying security events based on the concept of behavior change detection or "volatility." The security events are associated with provision of one or more online services. Behavior change detection is utilized, in place of a pre-defined patterns approach, to look at a system's behavior and detect any variances from what would otherwise be normal operating behavior. In operation, machine learning techniques are utilized as an event classification mechanism which facilitates implementation scalability. The machine learning techniques are iterative and continue to learn over time. This constitutes an improvement over rule-based systems that require new rules to be authored whenever the system changes. Through machine learning techniques, the manual process typically associated with rule-based systems is eliminated. Operational scalability issues are addressed by using the computed volatility of the events in a time series as input for a classifier. During a learning process (i.e., the machine learning process), the system identifies relevant features that are affected by security incidents. When in operation, the system evaluates those features in real-time and provides a probability that an incident is about to occur.

In at least some embodiments, a behavior change detection system collects behavior from a service, such as an online service, and detects behavior changes, either permanent or transient, in the service. Machine learning hierarchical (agglomerative) clustering techniques are utilized to compute deviations between clustered data sets representing an "answer" that the service presents to a series of requests.

In the discussion that follows, a section entitled "Example Environment" describes an example environment in which the various embodiments can be utilized. Next, a section entitled "Example Schemas" describes an example schema that can be utilized in connection with various embodiments. Following this, a section entitled "Training a Recognizer" describes embodiments in which a recognizer can be initially trained for deployment in accordance with one or more embodiments. Next, a section entitled "Behavior Change Analysis for Services—Example" described but one approach that can be used to conduct behavior change analysis in accordance with one embodiment. Next, a section entitled "In Operation" describes operational aspects of a deployed recognizer and an iterative machine learning process in accordance with one or more embodiments. Following this, a section entitled "Relating the System to the Schema" provides a diagrammatic representation of how an example schema, described below, relates to the described system. Next, a section entitled "Example Methods" describes example methods in accordance with one or more embodiments. Last, a section entitled "Example Device" describes an example device in accordance with one or more embodiments.

Consider now an example environment in which various embodiments can be practiced.

Example Environment

FIG. 1 is an illustration of an environment 100 in an example implementation that is operable to employ the techniques described herein. The illustrated environment 100 includes servers 102, 103, one or more client devices 104, and a network 106 communicatively coupling the servers and client devices.

Although the client device 104 is illustrated as being implemented by a traditional desktop computer, the client device 104 may be implemented by a variety of different devices. For example, the client device 104 may be configured as a computer that is capable of communicating over the network 106, such as a desktop computer, a mobile station, an entertainment appliance, a set-top box communicatively coupled to a display device, a wireless phone, a game console, a tablet computer, a netbook, and so forth. Thus, the client device 104 may range from a full resource device with substantial memory and processor resources (e.g., personal computers, game consoles) to a low-resource device with limited memory and/or processing resources (e.g., traditional set-top boxes, hand-held game consoles). Additionally, the devices may be representative of one or more devices, e.g., the functionality provided by server(s) 102 may be implemented by a plurality of servers in a server farm, such as those represented by servers 103.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The server 102 can be configured as any suitable type of server that can provide any suitable type of service 108 that can be consumed on line. In at least some embodiments, the server or servers can be configured to operate in a so-called "cloud computing" environment. Cloud computing refers to a computing model that enables ubiquitous network access to a shared and virtualized pool of computing capabilities. Such computing capabilities can include, by way of example and not limitation, network, storage, processing, and memory capabilities that can be rapidly provisioned. Cloud computing can encompass a variety of cloud providers, as well as several infrastructure-as-a-service (Iaas) and platform-as-a-service (Paas) solutions.

Specifically, server 102 can be configured as, by way of example and not limitation, an application server that is dedicated to running certain software applications (e.g., business-related applications), a catalog server that can provide a central search point for information across a distributed network, a communications server that provides a computing platform for communication networks, a computation server intended for intensive computations (e.g., scientific calculations), a database server that provides database services to other computer programs or computers, a fax server that provides fax services for client devices, a file server that provides remote access to files, a game server that enables video game clients to connect in order to play online games, a mail server that handles transport of and access to e-mail and other communication services, a name server that provides name resolution, a print server that provides print services, a proxy server that acts as an intermediary for requests from clients seeking resources from other servers, a sound server that provides multimedia broadcasting or streaming, a Web server that allows a HTTP clients to connect in order to send commands and receive responses along with data contents, and the like. As such, the number and variety of services offered by servers 102, 103 can vary greatly.

The individual servers can include a system, including a so-called recognizer, which is designed to utilize machine learning techniques to classify security events based on the concept of behavior change detection or "volatility." Behavior change detection is utilized, in place of a pre-defined patterns approach, to look at a system's behavior and detect any variances from what would otherwise be normal operating behavior. In operation, the machine learning techniques are utilized as an event classification mechanism. The machine learning techniques are iterative and continue to learn over time. This constitutes an improvement over rule-based systems that require new rules to be authored whenever the system changes. Through machine learning techniques, the manual process typically associated with rule-based systems is eliminated in favor of an automatically-updatable and continuously-learning solution.

A user of the client device 104 may interact with a communication module 110, which is representative of functionality of the client device 104 to interact with the network 106, and hence interact with various online services provided by servers 102, 103.

Various embodiments described above and below can be implemented utilizing a computer-readable storage medium that includes instructions that enable a processing unit to implement one or more aspects of the disclosed methods as well as a system configured to implement one or more aspects of the disclosed methods. By "computer-readable storage medium" is meant all statutory forms of media. Accordingly, non-statutory forms of media such as carrier waves and signals per se are not intended to be covered by the term "computer-readable storage medium".

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable storage media. The features of the volatility-based classifier are platform-independent, meaning that the techniques may be implemented on a variety of commercial computing platforms having a variety of processors.

Figure 6:
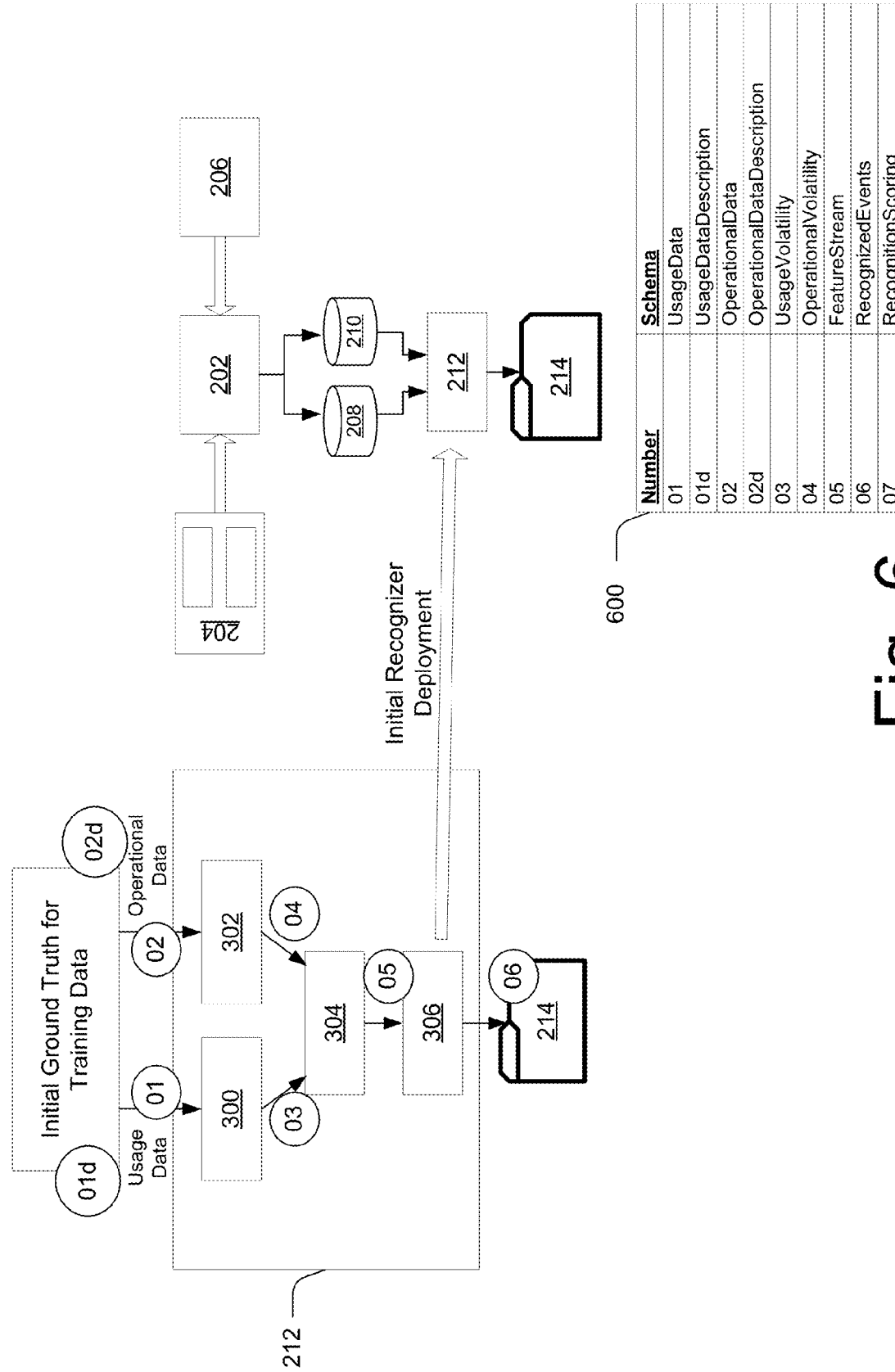
FIG. 6 illustrates aspects of how an example schema is mapped to an example system in accordance with one or more embodiments.
Figure 7:
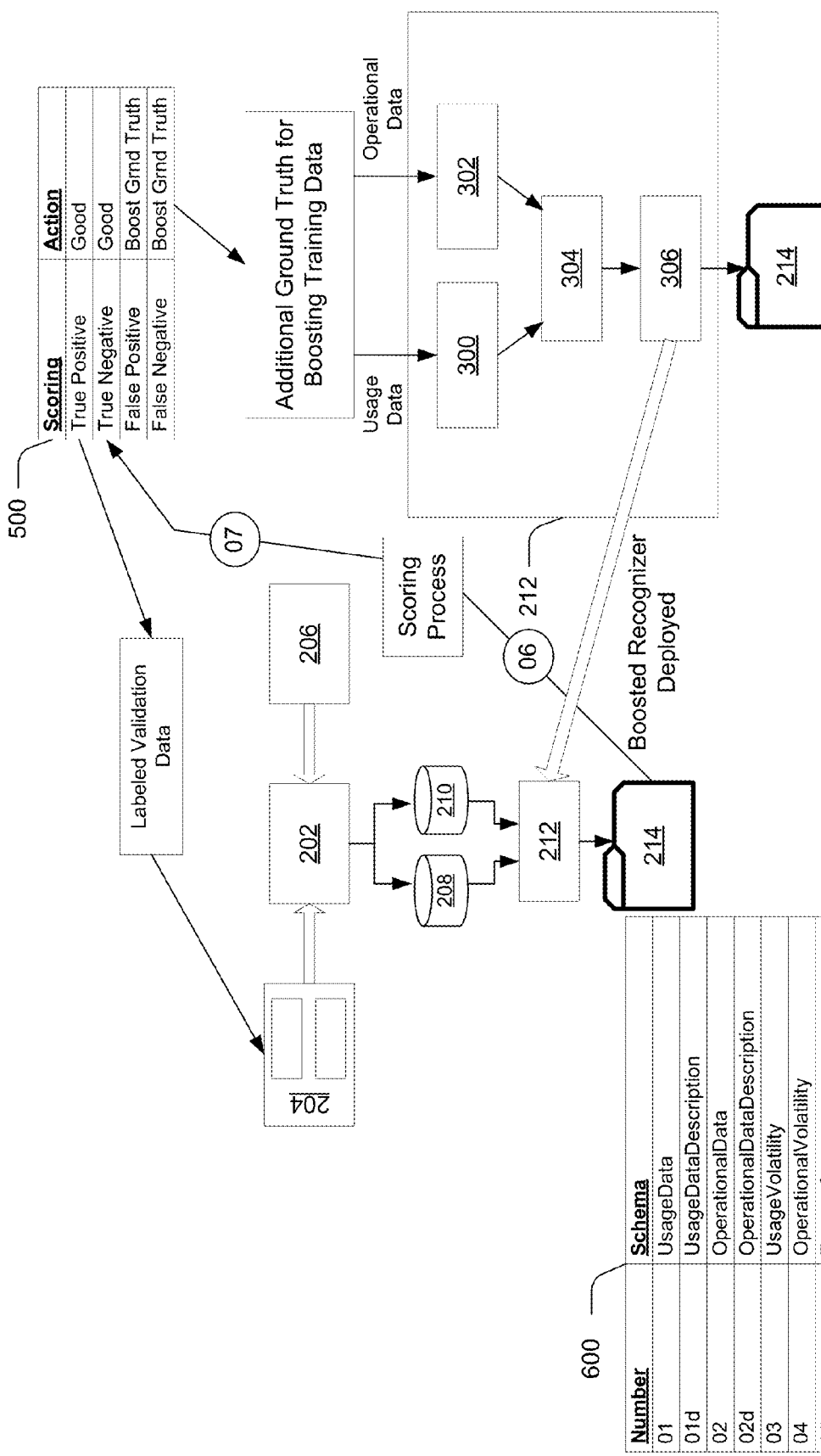
FIG. 7 illustrates aspects of how the example schema is mapped to the example system in accordance with one or more embodiments.

Having considered an example environment in which various embodiments can be employed, consider now preliminarily, an example schema that defines data flow between modules that are described below. It is to be appreciated and understood, however, that the schema about to be described constitutes but one example of a schema and is not to be used to limit application of the claimed subject matter. Near the end of this document, FIGS. 6 and 7 diagrammatically relate this schema to the system that is described just below.

Example Schemas

The schemas about to be discussed describe the data flows through a pipeline of processing modules for the volatility-based classifier. The schemas are first described, followed by a discussion of the various processing modules and how data described by the schemas flows through the processing modules.

"UsageData" is an open schema for usage data that describes how users interact with a particular service, e.g., online service requests to a particular web site, such as search queries in Bing.com.

"UsageDataDescription" is a schema for metadata about the UsageData. The metadata describes the UsageData in some particular way.

"OperationalData" is an open schema for the operational data for the datacenter hosting the services. OperationalData can include, by way of example and not limitation, aggregated CPU utilization, network traffic, memory usage, and the like.

"OperationalDataDescription" is a schema for metadata about the operation data. This metadata describes the OperationalData in some particular way.

"UsageVolatility" is an open schema for a time series with an indicated volatility of usage data. This can, for example, be a derivative for numerical features (like number of requests) or an open string capturing classes of changes, e.g., a string to capture that there are rendering differences in a web page within the last time period.

"OperationalVolatility" is an open schema for a time series with indicated volatility of operational data. As with the usage volatility, this can, for example, be a derivative for numerical features (like CPU utilization), or any other type of data that can summarize volatility within the target interval, e.g., categorical data, binary data or even null, in case the data was not captured.

"FeatureStream" is an open schema that captures the unified and correlated aggregation of both usage volatility and operational volatility in a time series bounded to predefined intervals (days, hours, minutes, seconds, milliseconds, etc.).

"RecognizedEvents" is an open schema that is used for the generated recognized events. Those are the points in time when usage and operational volatility deviate from historical data, based on annotated training data.

"RecognitionScoring" is an open schema that is used for the output of the scoring process of the recognized events against a so-called labeled "ground truth".

Having considered example schemas in accordance with one or more embodiments, consider now a discussion of the tools and processes for training a so-called "recognizer" for various events.

Training a Recognizer

This section describes how a so-called "recognizer" can be initially trained through machine learning techniques.

In the illustrated and described embodiments, the tools and processes that are utilized for training a recognizer include, by way of example and not limitation:

(1) a service that generates synthetic attacks;
(2) data streams that capture both usage and operational data;
(3) processor modules for computing usage data volatility and operational data volatility;
(4) a correlation module for computing correlation of time series streams from usage volatility and operational volatility;
(5) a machine learning training framework for data clustering, classification, and regression; and
(6) a machine learning runtime environment.

Figure 2:
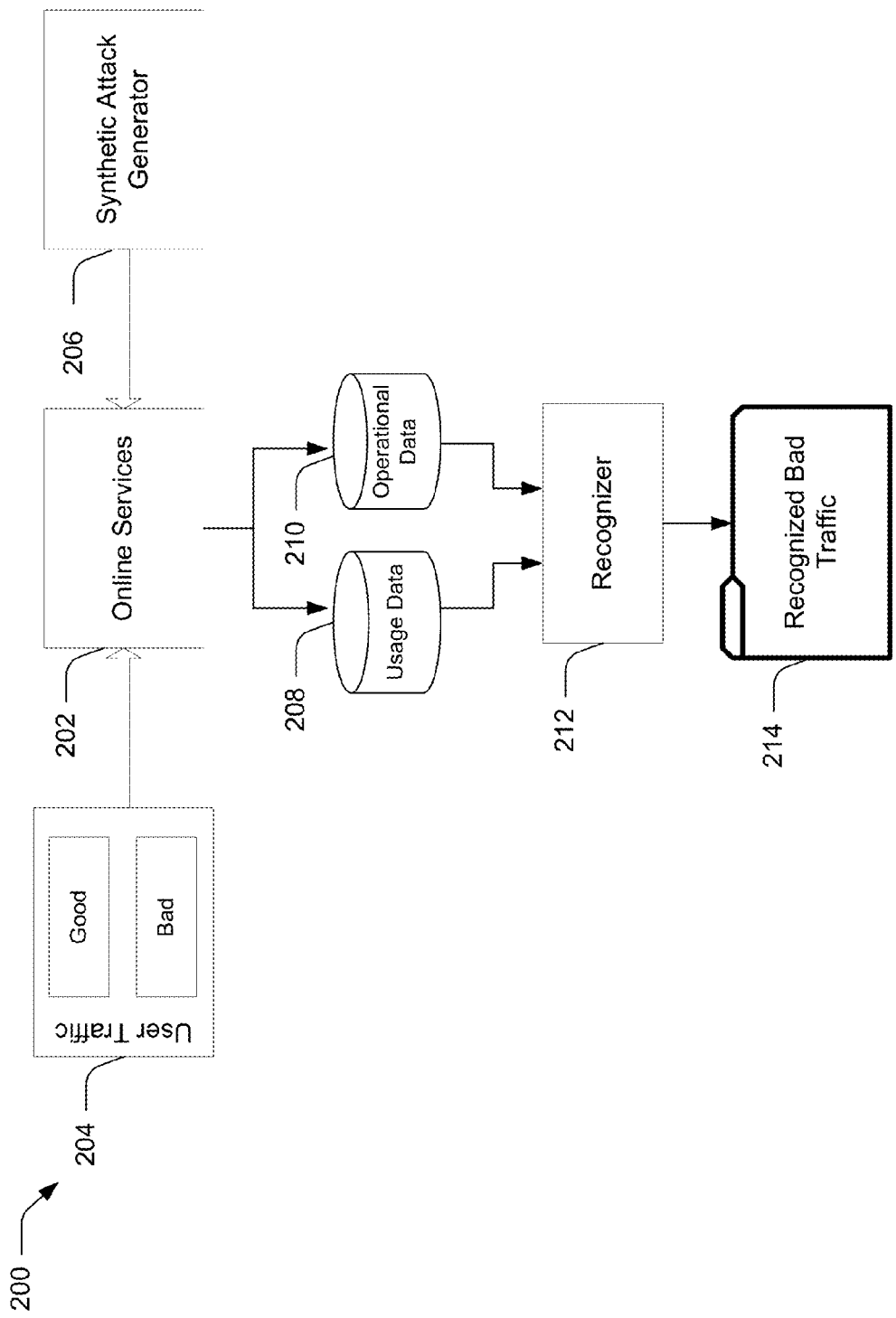
FIG. 2 illustrates an example system in accordance with one or more embodiments.

As an example, consider FIG. 2 which illustrates an example system in accordance with one or more embodiments generally at 200. The system 200 includes one or more online services 202, examples of which are provided above. In addition, system 200 includes a user traffic module 204, a synthetic attack generator 206, usage data 208, operational data 210, a recognizer 212 and so-called recognized bad traffic 214. The recognized bad traffic constitutes recognized events at points in time where usage and operational volatility deviate from historical data, based on training data described below.

The user traffic module 204 is representative of functionality associated with the user traffic with respect to a particular online service 202. Specifically, user traffic can constitute so-called "good" traffic which is typical, normal user interactions. These normal user actions would be those typically associated with how a user normally consumes or otherwise interacts with an online service. The user traffic can also constitute so-called "bad" user traffic. Bad user traffic constitutes traffic that is otherwise not normal, including attack-type traffic, malicious traffic, and other suspicious interactions.

The synthetic attack generator 206 is used to generate synthetic attacks on the online service 202. The synthetic attacks can take any suitable form and, in at least some embodiments, can be a function of the type of online service that is provided. The synthetic attack generator 206 can be used, for example, to generate special attack strings, inject attack code in various URLs and parameters discovered from various logs associated with online service. Many times, these known attacks can generate several million requests per day on an online service 202.

Responsive to the input received from the user traffic module 204 and the synthetic attack generator 206, the online service 202 produces two kinds of data—usage data 208 and operational data 210.

The usage data 208 can include any suitable type of data associated with a user's interaction with an online service. So, for example, a log can describe that a user navigated to a webpage at a certain point in time, made a query for a particular kind of cell phone, received results for the query, and then navigated to another webpage.

The operational data 210 describes aspects of the system's hardware and software operations. Such can include, by way of example and not limitation, aggregated CPU utilization, network traffic, memory usage, and the like. So, for example, the operational data may describe that a particular machine, over a period of time, went from having a first percentage of its memory free to a second percentage of its memory free.

These two pieces of data—the usage data and the operational data—are correlated and sequenced in a manner described in more detail below. Specifically, the usage data and the operational data are input to and processed by recognizer 212, as described below. The recognizer 212 utilizes machine learning techniques, as described in more detail below, to produce the recognized bad traffic 214, i.e., recognized events that constitute departures from historical behavior.

Figure 3:
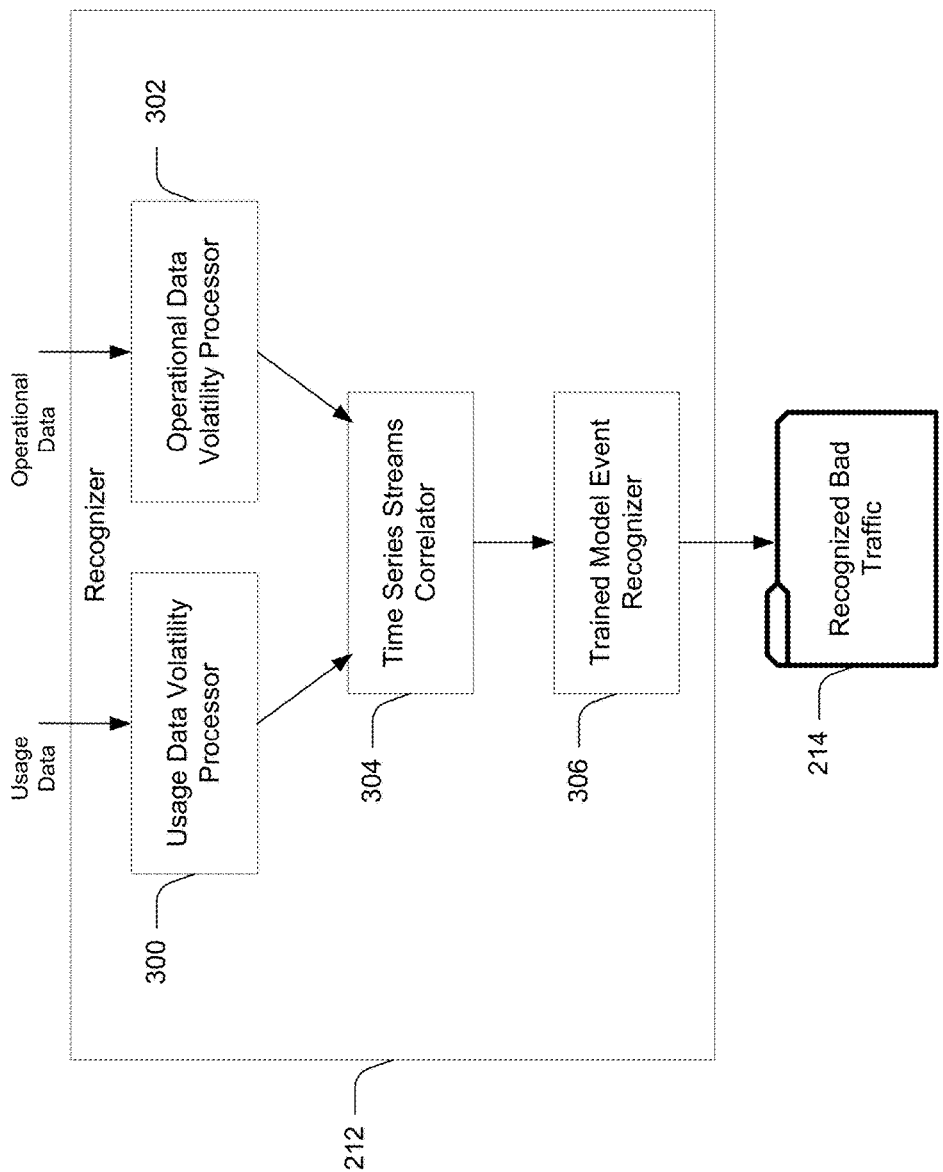
FIG. 3 illustrates an example recognizer in accordance with one or more embodiments.

FIG. 3 illustrates an example recognizer 212 in accordance with one or more embodiments. In this example, the recognizer is described as being deployed or operational. In this particular example, the recognizer 212 includes a usage data volatility processor 300, an operational data volatility processor 302, a time series streams correlator 304, and a trained model event recognizer 306.

The usage data mentioned above is received and processed by the usage data volatility processor 300. Likewise, the operational data is received and processed by the operational data volatility processor 302. Each of the processors 300, 302 process their respective data to analyze behaviors associated with the data. That is, each of these processors performs behavior change analysis on the data that it receives. Any suitable type of behavior change analysis can be conducted. So, for example, the usage data volatility processor may note that yesterday, a user utilized the online service to conduct a search for tickets to travel to Montreal. The search produced a webpage that was further consumed by the user. Today, however, when a similar search was conducted by a different user, the system behaved quite differently by perhaps producing different search results. Likewise, during this time, the operational data volatility processor 302 may note that yesterday's operational data during this search varied meaningfully in its memory usage as compared to today's similar search.

Based on the processing conducted by processors 300, 302, the observed behavioral change is quantified using a number or value which is correlated to the deviation of the behavioral change that is observed. Any suitable quantification scheme can be used in accordance with one or more embodiments. In at least some embodiments, the behavioral change is quantified using a value between 0 and 1. Quantification of the behavioral change in this manner enables classification of behavioral changes over time. This process produces a time series with user volatility and operational volatility data. But one example of how this can be done is provided below in a section entitled "Behavior Change Analysis for Online Services—Example".

The quantified behavioral change data is provided to the time series streams correlator 304 for processing. The correlator analyzes the data that it receives from the usage data volatility processor 300 and looks to see if any data received from the operational data volatility processor 302 indicates any behavioral change at a corresponding time. So, for example, if a usage behavioral deviation occurred at a particular time, the time series streams correlator 304 examines data from that time received from the operational data volatility processor 302 to ascertain whether operations were normal or varied in some meaningful degree, e.g., did CPU usage jump from 50% to 100%? Thus, correlation of the volatility of usage data and operational data can help to identify whether a particular behavioral deviation was even more out of the ordinary. This process produces a feature stream that captures the unified and correlated aggregation of both usage volatility and operational volatility in a time series bounded to a pre-defined interval.

The feature stream is provided to the trained model event recognizer 306. The recognizer 306 is configured to recognize, from the feature stream that it receives, normal versus abnormal behavior. So, for example, at a given time the operational data may indicate a behavioral change associated with a machine being turned off. When the correlated time series stream is examined, the trained model event recognizer 306 may note that the usage data associated with that time is normal. Accordingly, as of this time, the system was operating normally. However, the time series stream may indicate an operational data variance along with usage data that is out of the normal operating range. In this instance, this is recognized as bad traffic, i.e. a recognized event in which usage and operational volatility deviate from historical data, and a notification can be generated by the system to cause further investigation to be performed.

Behavior Change Analysis for Services—Example

Any issue in any service (security, privacy, regression, and the like) over time can be considered as a change in behavior. One example of a service is an online or Web-based service. In the approach described below, an initial behavior phase is utilized to collect an initial behavior for a service over a period of time. An exercise behavior phase is then utilized to collect an exercised behavior over a different period of time. The initial behavior phase and exercise behavior phase produce two data sets for which a deviation is computed. The deviation can indicate behavior changes and find issues or legitimate mutations.

In one or more embodiments, to compute deviations in behavior for services, such as online services, two concepts are utilized—the domain metadescriptor and matrix execution, each of which is discussed below. These concepts enable a behavior to be "built." Other approaches can be used without departing from the spirit and scope of the claimed subject matter.

Domain Metadescriptor

A domain metadescriptor describes elements out of context. Consider, for example, applying this concept to "http://www.bing.com", which is simply an HTML end point. One can see an example of this when extracting out algorithmic search results (e.g., blue links that appear in a search result page). In this instance, we are not taking into account environment factors such as the query, market, language, or any other parameter that can contribute at the context in which the algorithmic results gets manifested. A domain metadescriptor (MDD) is a collection of objects described in an independent context.

In the illustrated and described example, an MDD object has an extractor and a collection of features. A feature is a collection of actions. Actions examples for an algorithmic result can include: instances number, order of instances (for a particular context in which order is displayed), page position, and the like.

Let Extractor be E and Feature be F and Action be A, then an object can be expressed by:

$$O=\{(E,F(i)) \text{ with } i=1 \ldots n\}$$

where $F=\{A(i), \text{ with } i=1 \ldots n\}$.

Then a domain metadescriptor can be expressed by MDD=$\{O(i)$ with $i=1 \ldots n$:$O(i)$ context independent$\}$.

Modeling a domain metadescriptor as xml data would appear as in FIG. 2a (using an example describing the Bing algorithmic result). In this particular example, "algo results" (i.e. the blue links that appear in a search results page) are described. The domain metadescriptor essentially describes or defines what an "algo result" means out of context. Here, there is an extractor, features, and actions. The extractor extracts the specific object from a particular page. In this instance, the extractor extracts "algo results." The features assist in defining what a particular behavior means for the "algo results", i.e. the blue links. In this particular instance, the "algo results" are extracted and the behavior is analyzed. In this example, actions including color, page position for each blue link, and instances information all contribute to the behavior. In this manner, the features define properties that are of interest with respect to a particular service.

To conclude, a domain metadescriptor is utilized to describe what part of the domain behavior we are trying to examine and analyze for deviations.

Matrix Execution

Matrix execution describes an object context generator and can be thought of as describing the "question" that is going to be asked. A matrix execution puts a MDD in various kinds of contexts. A simple example using algorithmic results would be to render them for specific queries, markets, languages, and the like.

Let a context be C and expressed by C=$\{O(i)$ with $i=1 \ldots n$:$O(i)$ context dependent$\}$. Then a matrix execution can be expressed by MTX=$\{C(i),$ with $i=1 \ldots n\}$. And, subsequently MDD is subset of C. The MTX can be thought of as the mechanism that consumes an MDD.

Modeling a matrix execution as xml data would appear as indicated in FIG. 2b (using an example generating Bing contexts). In the illustrated and described example, matrix execution is built on using dynamic parameters. Each parameter is going to replace one variable from the endpoint value. In this example, there is a parameter "query" having values "microsoft" and "johann sebastian bach". At runtime, there will be a market "en-US" and a query of "microsoft" and a query of "johann sebastian bach". Likewise, there will be a market of "en-GB" and a query of "microsoft" and a query of "johann sebastian bach".

Behavior Collection Initial Phase

Consider now a behavior collection initial phase. Specifically, now that a MTX and MDD have been established, we can describe what a behavior is and how one is collected. We are looking at a MDD in a specific context triggered by MTX. Then we can express the MDD in a specific context by MDD(MTX)=$\{O(i,C(j)),$ with $i=1 \ldots n, j=1 \ldots m\}$ where $O(i,C(j))=\{(F(i,C(j))$ with $i=1 \ldots n, j=1 \ldots m\}$ than by replacement in the first expression we have MDD(MTX)=$\{F(i,C(j)),$ with $i=1 \ldots n, j=1 \ldots m\}$.

So now if a finite time period is defined as T=$\{t(1), \ldots t(k)\}$ and we collect a feature one for a specific context one over this time period, then this will appear as follows: $F(1,C(1),T)=\{A(i,C(1),t(j)),$ with $i=1 \ldots n, j=1 \ldots k\}$ The next step after we have those sets of values (for a feature in a specific context over a time period) is to cluster them using a machine learning hierarchical clustering algorithm (e.g., agglomerative approach).

Figure 3A:
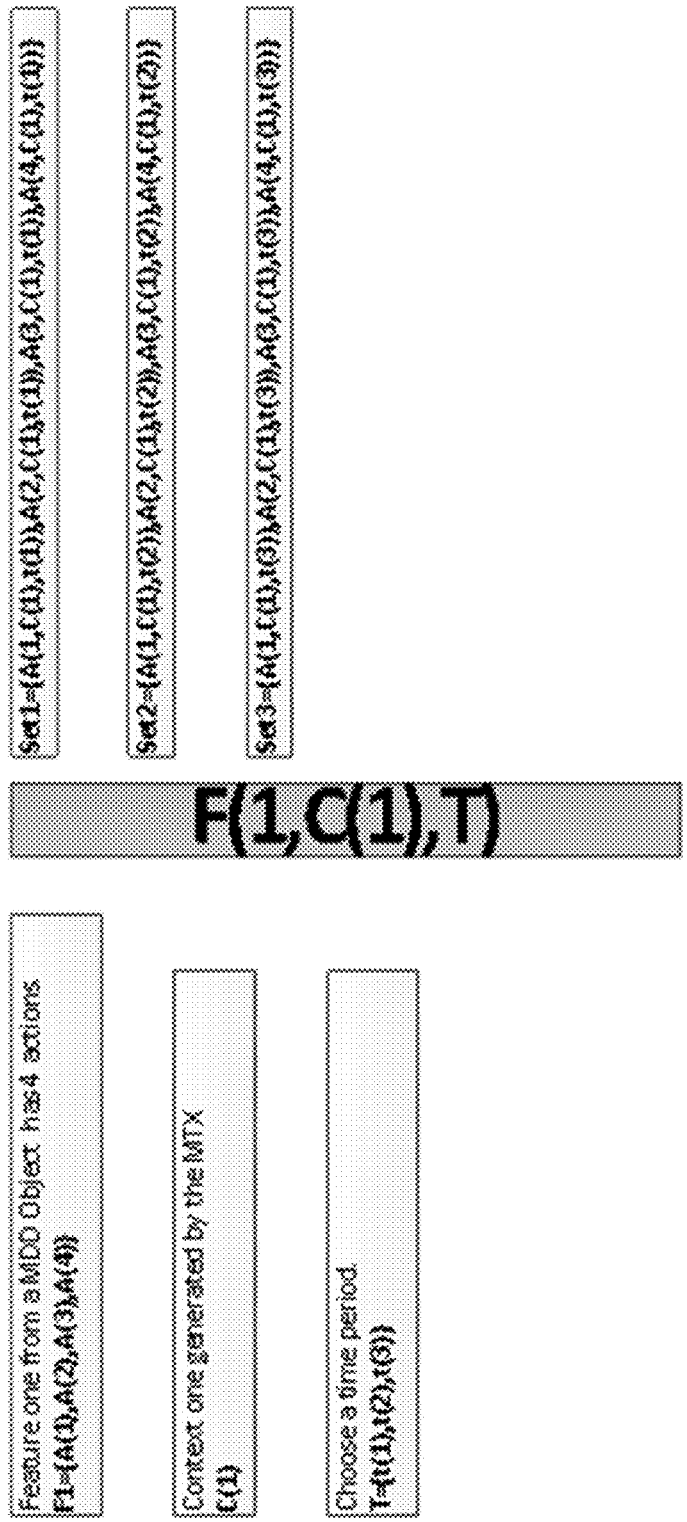
FIG. 3a illustrates aspects of how an object feature can be collected in a specific context over time.

Looking FIG. 3a, we cluster Set1, Set2, and Set3. So at the end we can say that a behavior for an object feature in a specific context over a time period is a cluster of clusters. Let Custer be CL=$\{\text{Set}(i),$ with $i=1 \ldots n\}$ and let a cluster of clusters be CLCL=$\{CL(i),$ with $i=1 \ldots n\}$.

Figure 3B:
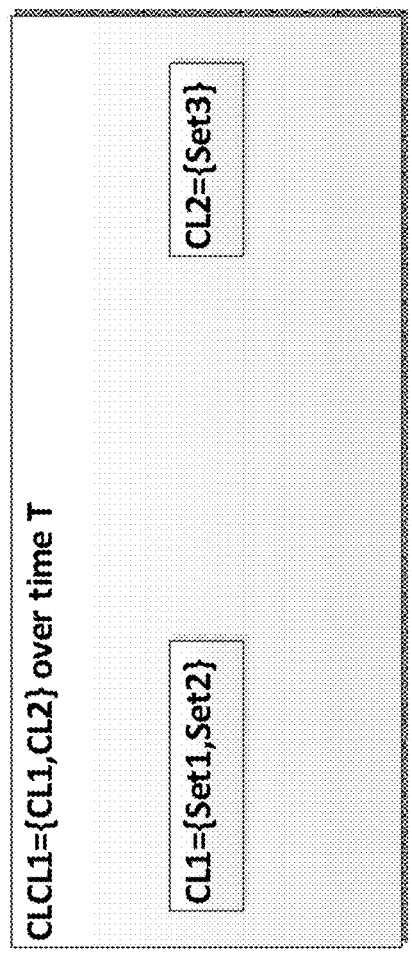
FIG. 3b illustrates an example of clustering the set values from FIG. 3b.

Looking at FIG. 3a, if CL1=$\{\text{Set1,Set2}\}$ and CL2=$\{\text{Set3}\}$ then CLCL1=$\{CL1,CL2\}$. As an example, consider FIG. 3b which illustrates an example of clustering the set of values from FIG. 3a.

To conclude, a behavior is a cluster of clusters, computed using the hierarchical clustering algorithm (e.g., agglomerative approach), using data collected for an object feature in specific context over a period of time. This can be expressed as follows: let Behavior be B=$\{CLCL(T)\}$, where CLCL is the cluster of clusters and T is the time period.

Behavior Collection Exercise Phase

Figure 3C:
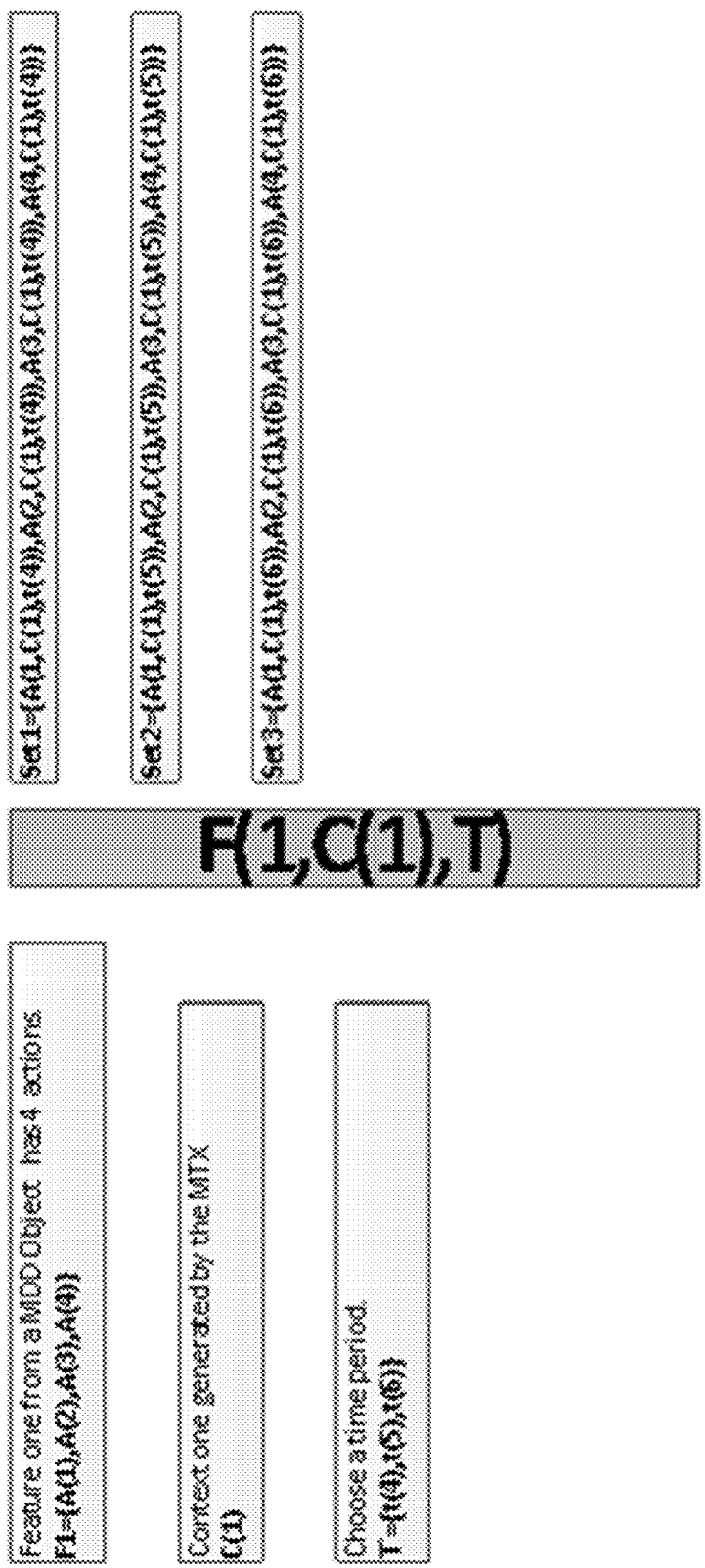
FIG. 3c illustrates aspects of how an object feature can be collected in a specific context over a time period.

Consider now a behavior collection exercise phase in accordance with one or more embodiments. This phase is actually being collected and computed in the same way as the initial phase (explained above). The only difference here will be the time (T). So if for an initial behavior phase we choose a T=$\{t(i),$ with $i=1 \ldots n\}$ then for the exercise phase we have to choose T'=$\{t(j),$ with $j=n+m, \ldots k$ and $m>=1$ and $k>m+n\}$. In other words there is no overlap between the two time periods. So the only particularity of the exercise phase is the fact that T should not overlap with the T' from the initial phase. FIG. 3c illustrates this.

Figure 3D:
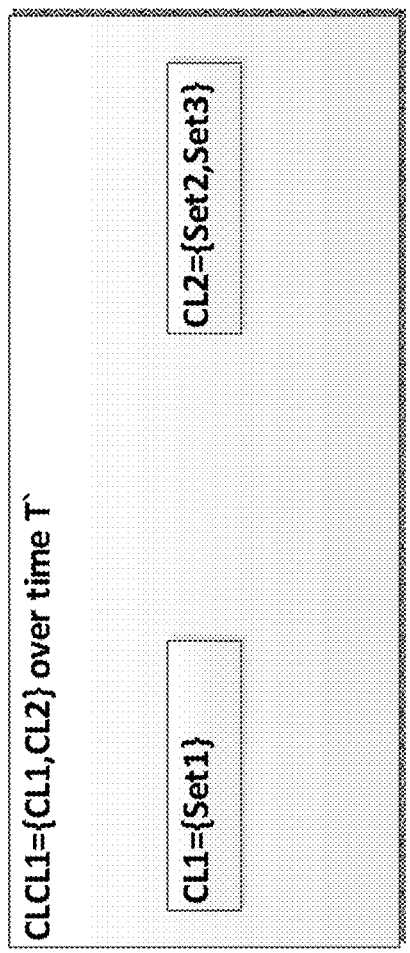
FIG. 3d illustrates an example of clustering the set values from FIG. 3c.

The behavior for the exercise phase is shown in FIG. 3d. The sets were collected over a different period of time therefore the cluster of clusters may look different.

It should be noted that the T and T' from initial and exercise behavior intervals should be equal. We want to have a symmetrical distribution data for each behavior phases. The context is uniformly spread across T, thus if j=i+1 and k=j+1 then t(j)−t(i)=t(k)−t(j) with i,j,k from 1 . . . n.

Computing Behavior Deviations

Figure 3E:
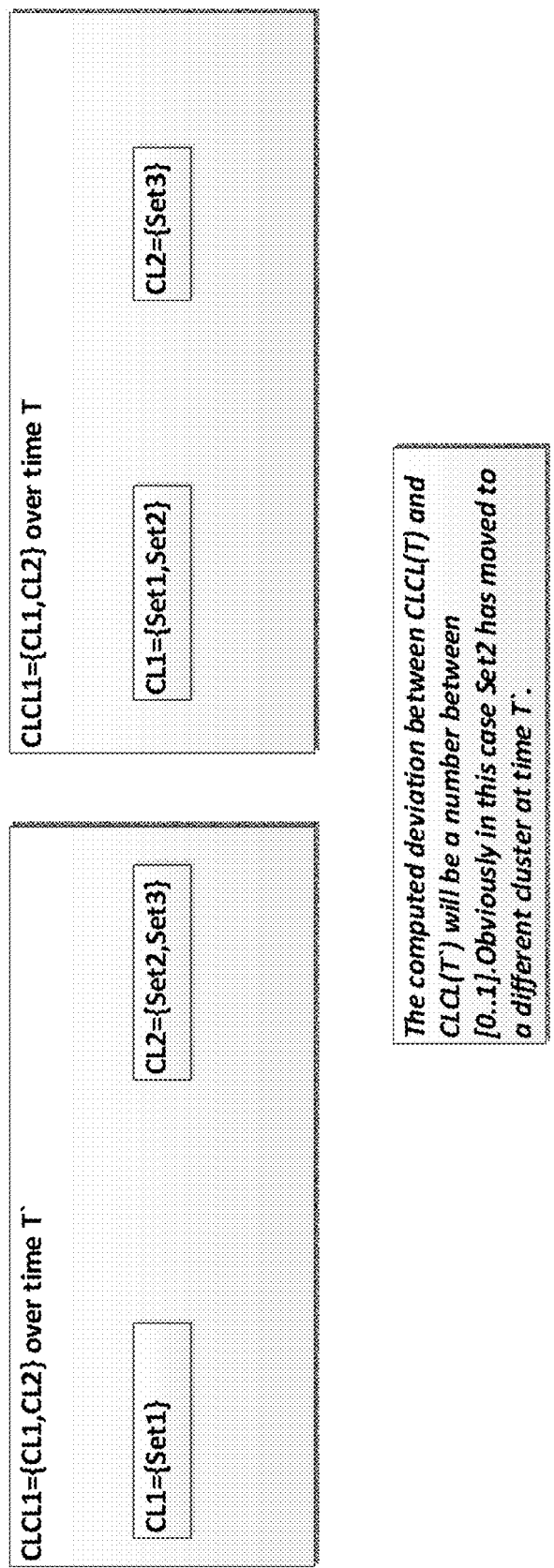
FIG. 3e illustrates a computer deviation in accordance with one or more embodiments.

Consider now the computation of behavior deviations in accordance with one embodiment. That is, with the two phases of behavior explained above, we can go further to compute the behavior deviation. To compute a deviation between two distinct phases of the same behavior, we compute the symmetrical difference between the two clusters of clusters. So a symmetrical difference between:

$$CLCL(T)\Delta CLCL(T')=CLCL(T)UCLCL(T')-\\CLCL(T)\cap CLCL(T') \text{ (or } B(T)\Delta B(T')=B(T)UB\\(T')-B(T)\cap B(T'))$$

is the actual deviation between the two phases of the same behavior. That is, the symmetrical difference is the union of the two clusters minus the intersection of the two clusters. FIG. 3e illustrates this.

$B(T)\Delta B(T')$ is greater than or equal to zero and less than or equal to one.

A deviation equal to zero means no change in behavior; consequently a value equal to one means that the behavior has totally changed. Now a decision can be made as to what this deviation means, whether it is an issue or not, and if it is an issue, what kind of issue (e.g., security, regular regression, privacy).

By collecting behavior deviations, classifying them, and making the system remember them, issues can be found including security, regular regression, privacy issues. The testing coverage is highly improved, will not be highly human dependent as time goes by, and will learn as well as be able to identify unknown issues.

Figure 3F:
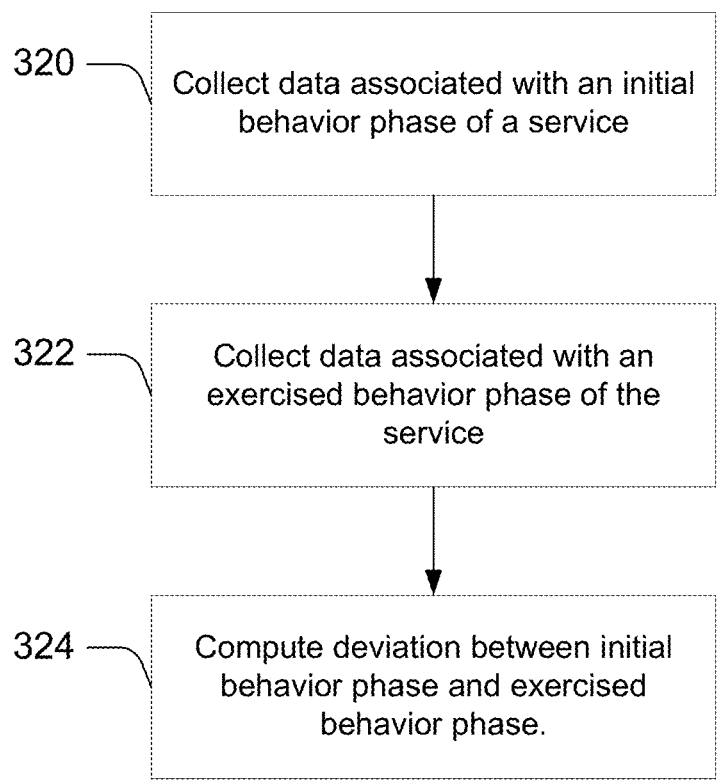
FIG. 3f is a flow diagram that describes steps in a method in accordance with one or more embodiments.

FIG. 3f is a flow diagram that describes steps in behavior change detection method in accordance with one or more embodiments. The method can be implemented in connection with any suitable hardware, software, firmware, or combination thereof.

Step 320 collects data associated with an initial behavior phase of a service. Examples of how this can be done are provided above and below. Step 322 collects data associated with an exercised behavior phase of the service. Examples of how this can be done are provided above and below. Step 324 computes a deviation between the initial behavior phase and the exercised behavior phase. Examples of how this can be done are provided above.

Figure 3G:
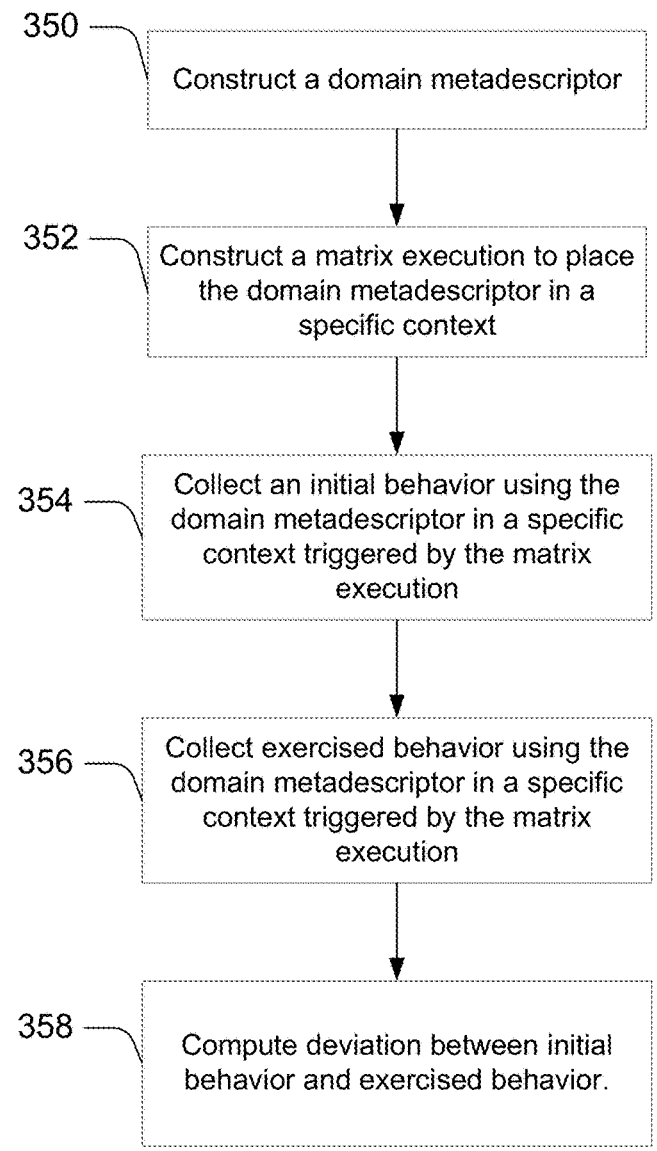
FIG. 3g is a flow diagram that describes steps in a method in accordance with one or more embodiments.

FIG. 3g is a flow diagram that describes steps in a behavior change detection method that can be used to implement the method of FIG. 3f in accordance with one or more embodiments. The method can be implemented in connection with any suitable hardware, software, firmware, or combination thereof.

Step 350 constructs a domain metadescriptor. Examples of how this can be done are provided above. Step 352 constructs a matrix execution to place the domain metadescriptor in a specific context. Step 354 collects an initial behavior using the domain metadescriptor in a specific context triggered by the matrix execution. Step 356 collects exercised behavior using the domain metadescriptor in a specific context triggered by the matrix execution. Step 358 computes a deviation between the initial behavior and the exercised behavior.

Having considered how a recognizer can be trained and deployed for use, and how behavior change analysis can be conducted, consider now a discussion of an example overall process for connecting various processing modules and performing operational evaluation, including continued training using machine learning techniques.

In Operation

The following discussion describes an iterative process through which security events can be recognized by a recognizer, and machine learning techniques can be employed to automatically and continuously enable the recognizer to further learn how to recognize security events.

Figure 4:
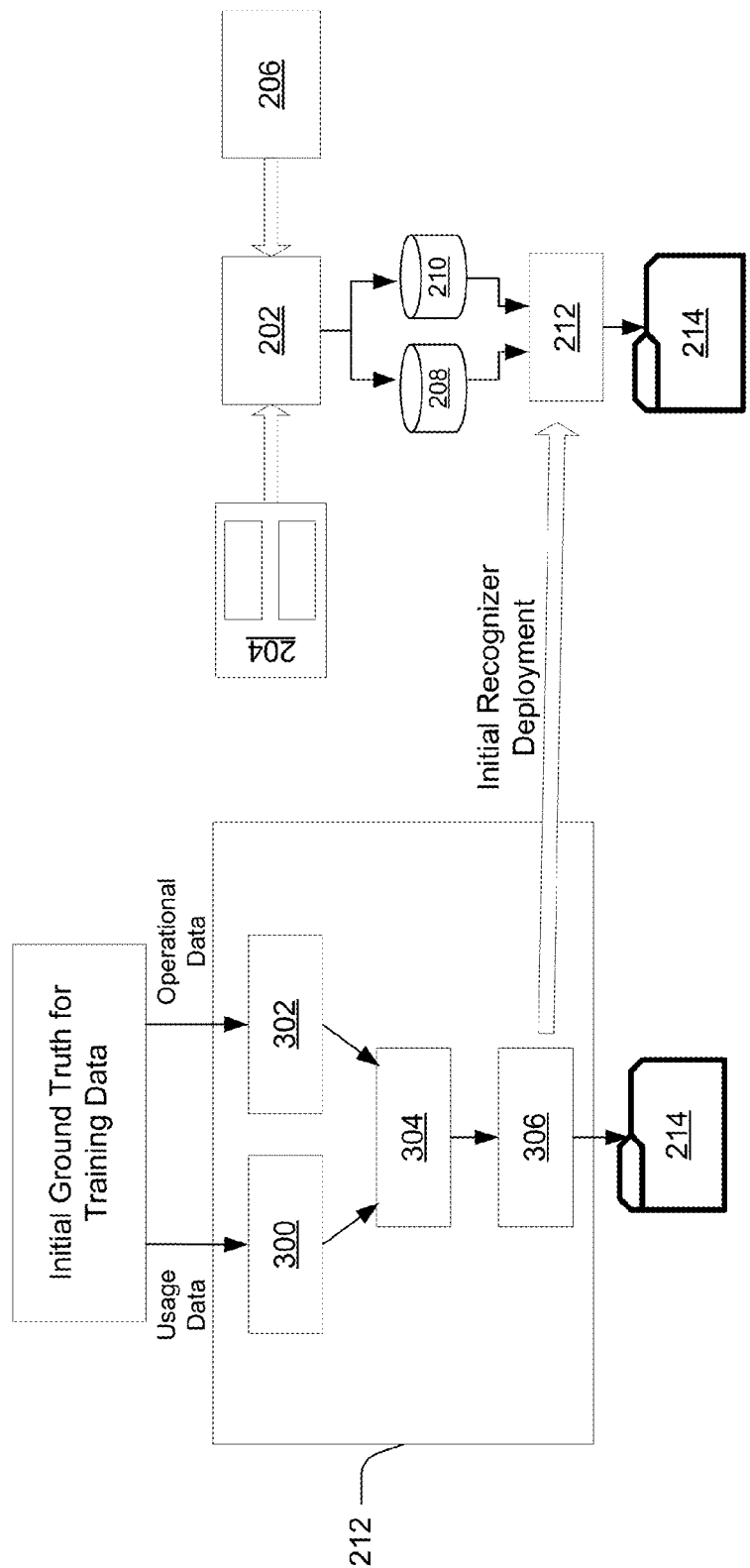
FIG. 4 illustrates the example system undergoing an iterative, machine learning process.
Figure 5:
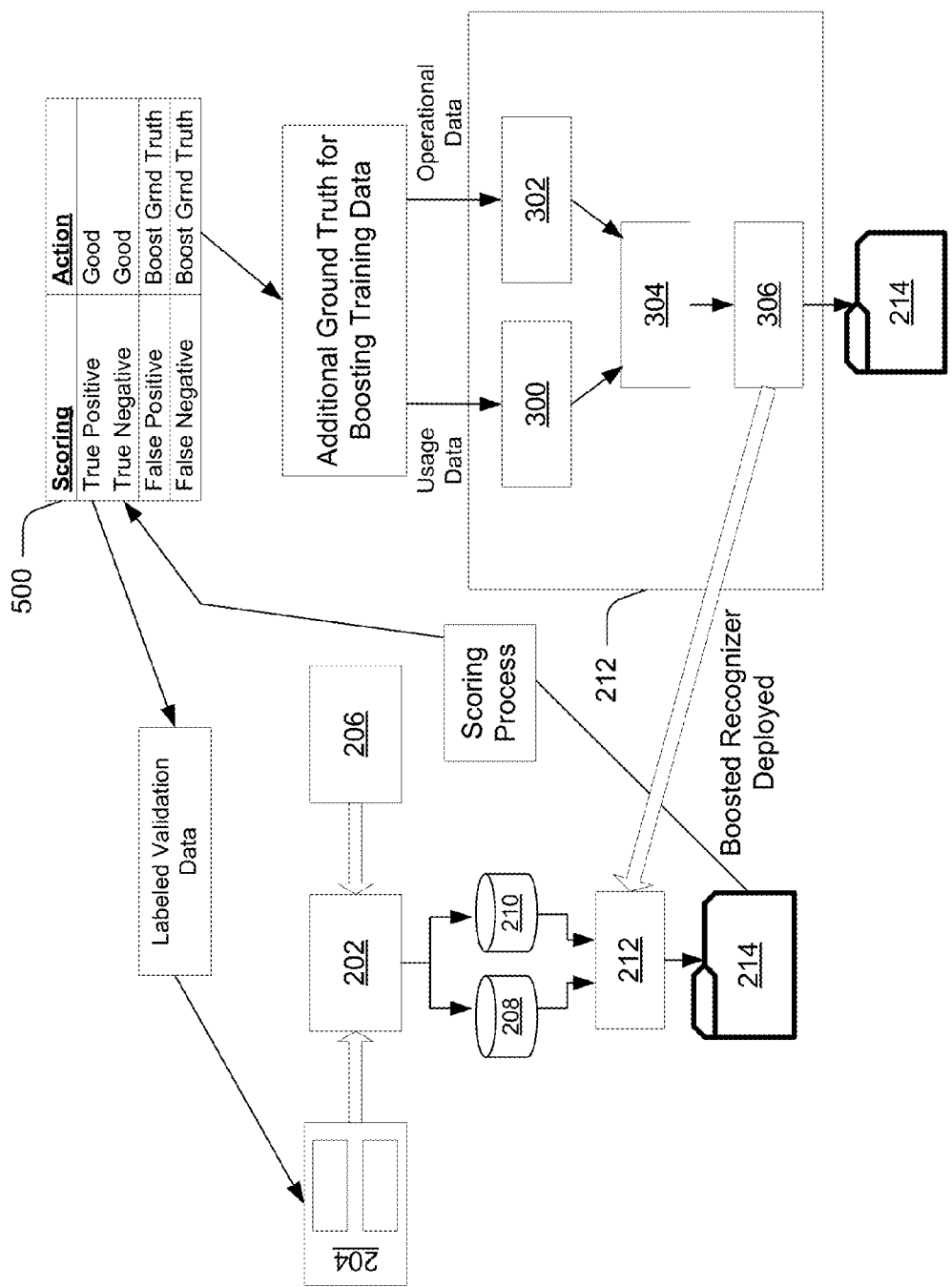
FIG. 5 illustrates the example system undergoing an iterative, machine learning process.

In the discussion that follows, both FIGS. 4 and 5 are utilized. FIG. 4 describes the iterative process from the standpoint of the initial deployment of the recognizer, and FIG. 5 describes how the recognizer can be further trained or "boosted." For purposes of the discussion and because of spacing constraints, the names of the individual elements or modules have been removed. However, the corresponding numerical designators for each element have been carried through from the previous discussion.

Referring to FIG. 4, initial training occurs through the use of what is referred to as the initial ground truth for training data. The initial ground truth includes data that describes, for a particular online service, behaviors that appear to be normal and behaviors that appear to be not normal. This data can be developed over time and can be iteratively boosted by subsequent machine learning techniques, as will become apparent below. This data can reside in the form of both usage data and operational data as described above.

Training of the recognizer 212 using the initial ground truth takes place essentially as described above. Once initially trained, the recognizer can be deployed as indicated by the arrow extending from the trained model event recognizer 306 to the rightmost recognizer 212.

Referring now to FIG. 5, the deployed recognizer, i.e. the left-most recognizer 212, is ready to take part in the iterative, machine learning process. In operation, when the recognizer 212 is online, it receives usage data 208 and operational data 210 and processes the data as described above. Specifically, the usage data 208 and operational data 210 are processed to produce recognized bad traffic or recognized events.

The system then employs an evaluation and scoring process during which time the recognized bad traffic is evaluated and scored for purposes of further honing the system's ability to recognize bad traffic. In this example, the evaluation and scoring process is represented by an arrow that extends from the leftmost recognized bad traffic 214 to a scoring table 500. Each instance of recognized bad traffic is scored as either a "true positive", "true negative", "false positive", or "false negative".

As will be appreciated by the skilled artisan, "true positives" and "true negatives" are instances where the system is behaving as intended. That is to say, the system is correctly identifying and recognizing bad traffic and not recognizing traffic that is not bad traffic. The instances in which the evaluation and scoring process identifies a "false positive" or a "false negative" constitute instances in which an iterative learning process can be employed to further boost the accuracy with which the system can identify security threats.

Specifically, a "false positive" is a situation in which traffic was identified as bad but, in fact, the traffic was not bad. A "false negative" is a situation in which something should have been identified as bad traffic but was not identified as bad traffic. In both of these instances, an action is taken to boost the ground truth by providing this information back to the recognizer in the form of additional ground truth training data—both usage data and operational data—that can further be processed by the system. This data is also used as validation data for the user traffic module 204. The result of using this additional training data is that the deployed recognizer can be boosted as indicated by the arrow extending from the trained model event recognizer 306 to the leftmost recognizer 212.

This process can continue automatically to develop additional training data that is fed back into the system for both training and validation which, in turn, increases the effectiveness with which the recognizer can perform its operations.

Relating the System to the Schema

Earlier, the notion of a schema was introduced to describe data that is processed by the system as described above. The following discussion relates the schema to the system that was just described above. Similar to the manner in which FIGS. 4 and 5 were discussed, FIGS. 6 and 7 are now provided. Also provided is a table 600 that includes a mapping of numbers to schema elements. These numbers are then encircled and provided onto the diagrams in each figure to show where in the process, data of the schema elements is utilized.

Beginning with FIG. 6, metadata (01d and 02d) associated with usage data and operational data, respectively, is utilized to describe usage data (01) and operational data (02) respectively. The usage data and operational data are processed by their respective volatility processors 300, 302 to produce, respectively, usage volatility (03) and operational volatility (04) time series, as described above. These time series are processed by the time series streams correlator 304 to produce a feature stream (05). The feature stream captures the unified and correlated aggregation of both usage volatility and operational volatility in the time series bounded to pre-defined intervals such as, by way of example and not limitation, days, hours, minutes, seconds, milliseconds, and the like. The feature stream is processed by the trained model event recognizer 306 to produce recognized events (06), referred to as "bad traffic" in the above description.

Shifting now to FIG. 7, the recognized events (06) undergo an evaluation and scoring process to produce recognition scoring data (07) in which the recognized events are scored against the labeled ground truth. The process then continues as described above. That is, the recognizer can be boosted through machine learning techniques that employ identified false positives and false negatives to improve the system's ability to identify bad traffic or recognized events.

Example Methods

Figure 8:
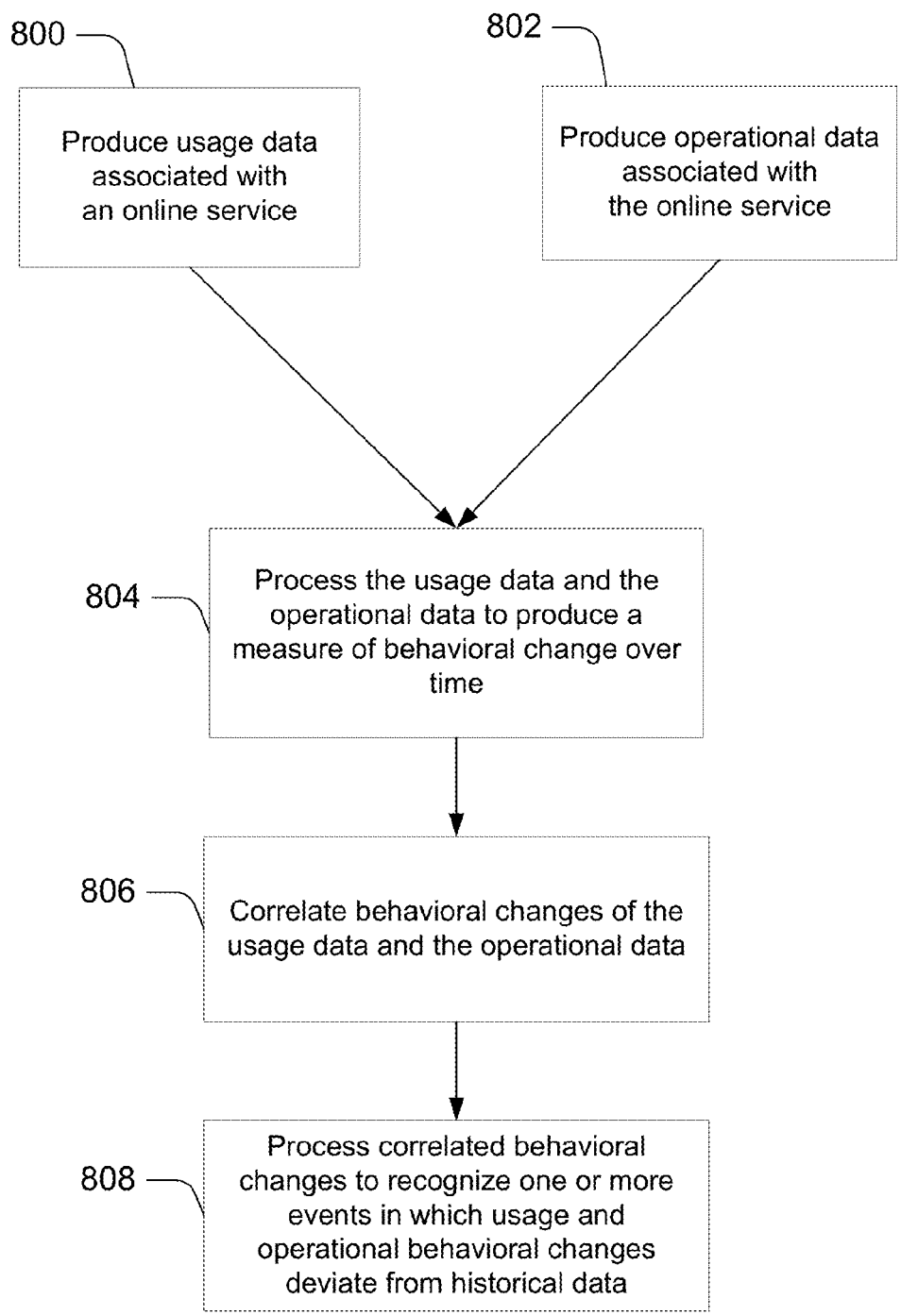
FIG. 8 is a flow diagram that describes steps in a method in accordance with one or more embodiments.

FIG. 8 is a flow diagram that describes steps in a training method used to train a recognizer in accordance with one or more embodiments. The method can be implemented in connection with any suitable hardware, software, firmware, and the like. In at least some embodiments, the method or aspects thereof can be implemented by a suitably-configured recognizer, such as the recognizers described above.

Step 800 produces usage data associated with an online service. Step 802 produces operational data associated with the online service. Steps 800 and 802 can be performed in any suitable way. For example, in at least some embodiments, usage and operational data are produced by observing how users interact with the online service. As noted above, this can include both good and bad interactions. In addition, usage and operational data can be produced from synthetic attack patterns that are processed by the online service. Examples of synthetic attack patterns are provided above. Data produced by steps 800 and 802 can be produced in parallel.

Step 804 processes the usage data and the operational data to produce a measure of behavioral changes over time. This step can be performed in any suitable way. For example, in the embodiments described above, volatility processors process the usage data and operational data, respectively, to produce a quantified measure that is correlated to the deviation of behavioral change over time. Step 806 correlates behavioral changes of the usage data and the operational data. Examples of how this can be done are provided above. The usage data and operational data can be processed in parallel.

Step 808 processes the correlated behavioral changes to recognize one or more events in which usage and operational behavioral changes deviate from historical data.

Figure 9:
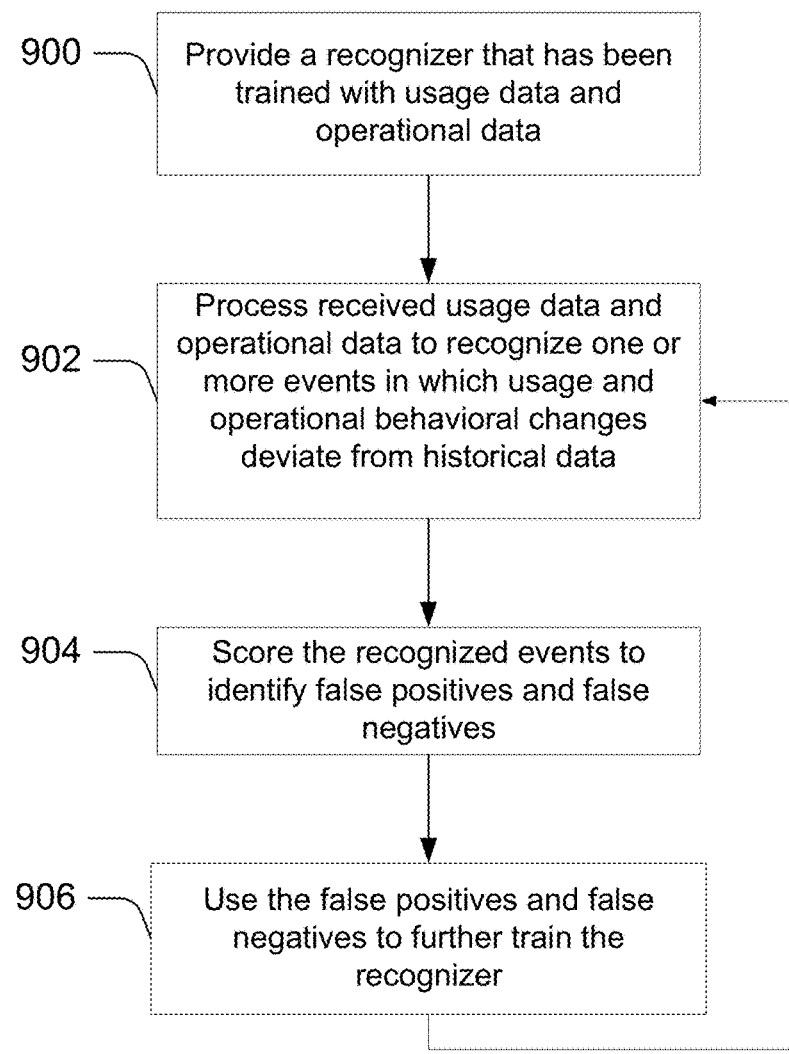
FIG. 9 is a flow diagram that describes steps in a method in accordance with one or more embodiments.

FIG. 9 is a flow diagram that describes steps in a method in which a trained recognizer, through machine learning techniques, can be continuously and automatically boosted to more effectively identify bad traffic or recognized events, in accordance with one or more embodiments. The method can be implemented in connection with any suitable hardware, software, firmware, and the like. In at least some embodiments, the method or aspects thereof can be implemented by a suitably-configured recognizer, such as the recognizer's described above.

Step 900 provides a recognizer that has been trained with usage data and operational data. An example of how this can be done is provided above. Step 902 processes received usage data and operational data to recognize one or more events in which usage and operational behavioral changes deviate from historical data. An example of how this can be done is provided above. Specifically, with respect to the method described in FIG. 8, one way in which this step can be performed is through the combination of steps 804, 806, and 808.

Step 904 scores the recognized events to identify false positives and false negatives. Examples of how this can be done are provided above. Step 906 uses the false positives and false negatives to further train the recognizer. Examples of how this can be done are provided above. The method can then return to step 902 to continue receiving and processing usage and operational data as described above.

Example Device

Figure 10:
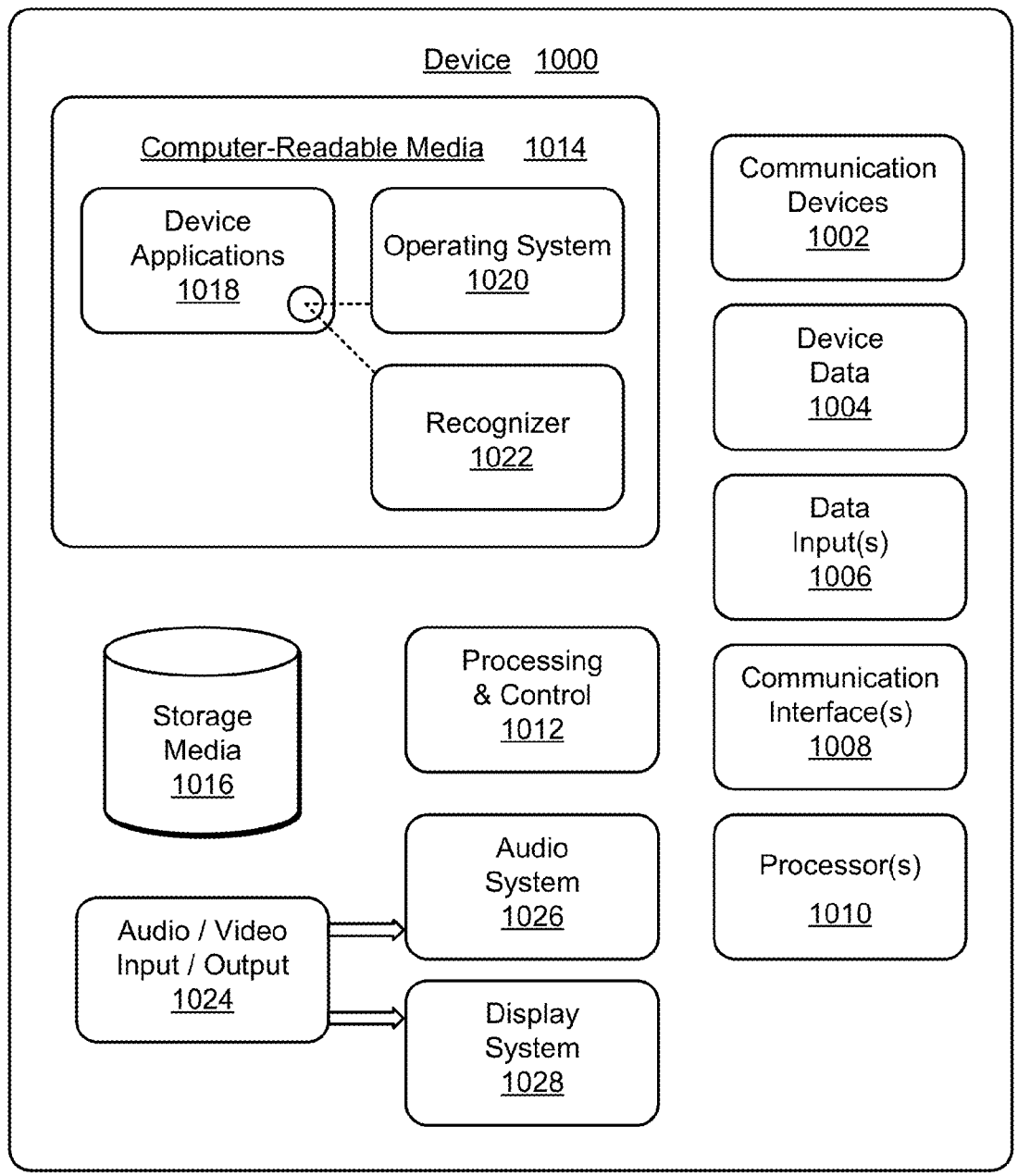
FIG. 10 is an example device in accordance with one or more embodiments.

FIG. 10 illustrates various components of an example device 1000 that can be implemented as any type of portable and/or computer device to implement the embodiments described herein. Device 1000 includes communication devices 1002 that enable wired and/or wireless communication of device data 1004 (e.g., received data, data that is being received, data scheduled for broadcast, data packets of the data, etc.). The device data 1004 or other device content can include configuration settings of the device, media content stored on the device, and/or information associated with a user of the device. Media content stored on device 1000 can include any type of audio, video, and/or image data. Device 1000 includes one or more data inputs 1006 via which any type of data, media content, and/or inputs can be received, such as user-selectable inputs, messages, music, television media content, recorded video content, and any other type of audio, video, and/or image data received from any content and/or data source.

Device 1000 also includes communication interfaces 1008 that can be implemented as any one or more of a serial and/or parallel interface, a wireless interface, any type of network interface, a modem, and as any other type of communication interface. The communication interfaces 1008 provide a connection and/or communication links between device 1000 and a communication network by which other electronic, computing, and communication devices communicate data with device 1000.

Device 1000 includes one or more processors 1010 (e.g., any of microprocessors, controllers, and the like) which process various computer-executable or readable instructions to control the operation of device 1000 and to implement the embodiments described above. Alternatively or in addition, device 1000 can be implemented with any one or combination of hardware, firmware, or fixed logic circuitry that is implemented in connection with processing and control circuits which are generally identified at 1012. Although not shown, device 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1000 also includes computer-readable media 1014, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1000 can also include a mass storage media device 1016.

Computer-readable media 1014 provides data storage mechanisms to store the device data 1004, as well as various device applications 1018 and any other types of information and/or data related to operational aspects of device 1000. For example, an operating system 1020 can be maintained as a computer application with the computer-readable media 1014 and executed on processors 1010. The device applications 1018 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 1018 also include any system components or modules to implement embodiments of the techniques described herein. In this example, the device applications 1018 can include recognizer 1022 that operates as described above.

Device 1000 also includes an audio and/or video input-output system 1024 that provides audio data to an audio system 1026 and/or provides video data to a display system 1028. The audio system 1026 and/or the display system 1028 can include any devices that process, display, and/or otherwise render audio, video, and image data. Video signals and audio signals can be communicated from device 1000 to an audio device and/or to a display device via an RF (radio frequency) link, S-video link, composite video link, component video link, DVI (digital video interface), analog audio connection, or other similar communication link. In an embodiment, the audio system 1026 and/or the display system 1028 are implemented as external components to device 1000. Alternatively, the audio system 1026 and/or the display system 1028 are implemented as integrated components of example device 1000.

Example Implementations

Example implementations of behavior change detection system for services described herein include, but are not limited to, one or any combination of one or more of the following example:

A method implemented by a computing device comprising: collecting data associated with an initial behavior phase of a service; collecting data associated with an exercised behavior phase of the service; and computing (324) a deviation between the initial behavior phase and the exercised behavior phase.

A method as described above, wherein the service comprises an online service.

A method as described above, wherein collecting data associated with the initial behavior phase comprises using a domain metadescriptor in a specific context triggered by a matrix execution.

A method as described above, wherein collecting data associated with the exercised behavior phase comprises using a domain metadescriptor in a specific context triggered by a matrix execution.

A method as described above, wherein collecting data associated with the initial behavior phase comprises using a domain metadescriptor in a specific context triggered by a matrix execution; and wherein collecting data associated with the exercised behavior phase comprises using the domain metadescriptor in a specific context triggered by the matrix execution.

A method as described above, wherein the domain metadescriptor is a collection of objects described in an independent context.

A method as described above, wherein the domain metadescriptor includes an extractor that extracts specific objects from a page and a collection of features which define what a behavior means.

A method as described above, wherein the matrix execution describes an object context generator.

A method as described above, wherein collecting data associated with the initial behavior phase and collecting data associated with the exercised behavior phase are performed over different finite time periods having the same length.

A method as described above, wherein collecting data associated with the initial behavior phase defines a set of values and wherein collecting data associated with the exercised behavior phase defines another set of values and further comprising clustering both sets of values into respective clusters.

A method as described above, wherein said clustering both sets of values comprises using a machine learning hierarchical clustering algorithm.

A computing device comprising: one or more processors; one or more computer readable storage media storing computer readable instructions which, when executed, perform operations comprising: constructing a domain metadescriptor; constructing a matrix execution to place the domain metadescriptor in a specific context; collecting an initial behavior using the domain metadescriptor in a specific context triggered by the matrix execution; collecting an exercised behavior using the domain metadescriptor in the specific context triggered by the matrix execution; and computing (358) a deviation between the initial behavior and the exercised behavior.

The computing device described above, wherein collecting an initial behavior phase defines a set of values and wherein collecting the exercised behavior phase defines another set of values and further comprising clustering both sets of values into respective clusters.

The computing device described above, wherein said clustering both sets of values comprises using a machine learning hierarchical clustering algorithm.

The computing device described above, wherein computing the deviation comprises computing asymmetrical difference between the respective clusters.

The computing device described above, wherein computing the deviation comprises computing the union of the respective clusters minus the intersection of the respective clusters.

The computing device described above, wherein the initial behavior and the exercised behavior are associated with a service.

The computing device described above, wherein the initial behavior and the exercised behavior are associated with an online service.

The computing device described above, wherein computing the deviation comprises computing asymmetrical difference between the respective clusters.

The computing device described above, wherein computing the deviation comprises computing the union of the respective clusters minus the intersection of the respective clusters.

CONCLUSION

Various embodiments provide an approach to classifying security events based on the concept of behavior change detection or "volatility." Behavior change detection is utilized, in place of a pre-defined patterns approach, to look at a system's behavior and detect any variances from what would otherwise be normal operating behavior. In operation, machine learning techniques are utilized as an event classification mechanism which facilitates implementation scalability. The machine learning techniques are iterative and continue to learn over time. Operational scalability issues are addressed by using the computed volatility of the events in a time series as input for a classifier. During a learning process (i.e., the machine learning process), the system identifies relevant features that are affected by security incidents. When in operation, the system evaluates those features in real-time and provides a probability that an incident is about to occur.

In at least some embodiments, a behavior change detection system collects behavior from a service, such as an online service, and detects behavior changes, either permanent or transient, in the service. Machine learning hierarchical (agglomerative) clustering techniques are utilized to compute deviations between clustered data sets representing an "answer" that the service presents to a series of requests.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A computer-implemented method comprising:
    collecting, via a hardware processor, using a domain metadescriptor in a specific context triggered by a matrix execution, first data associated with an initial behavior phase of a service defining a first set of values;
    collecting, via the hardware processor, using the domain metadescriptor in the specific context triggered by the matrix execution, second data associated with an exercised behavior phase of the service defining a second set of values;
    clustering the first and second sets of values into respective clusters using a machine learning hierarchical clustering algorithm; and
    computing, via the hardware processor, a deviation between the first data associated with the initial behavior phase and second data associated with the exercised behavior phase of the service based on the respective clusters.

2. The method of claim 1, wherein the service comprises an online service.

3. The method of claim 1, wherein the domain metadescriptor is a collection of objects described in an independent context.

4. The method of claim 3, wherein the domain metadescriptor includes an extractor that extracts specific objects from a page and a collection of features which define what a behavior means.

5. The method of claim 1, wherein the matrix execution describes an object context generator.

6. The method of claim 1, wherein collecting the first data associated with the initial behavior phase and collecting the second data associated with the exercised behavior phase are performed over different finite time periods having a same length.

7. The method of claim 1, wherein computing the deviation comprises computing, via the hardware processor, an asymmetrical difference between the respective clusters.

8. The method of claim 1, computing the deviation comprises computing, via the hardware processor, a union of the respective clusters minus an intersection of the respective clusters.

9. A computing device comprising:
    one or more hardware processors;
    one or more computer readable storage media storing computer readable instructions which, when executed on the hardware processors, cause the one or more hardware processors to:
    construct a domain metadescriptor;
    construct a matrix execution to place the domain metadescriptor in a specific context;
    collect initial behavior data using the domain metadescriptor in the specific context triggered by the matrix execution defining a first set of values;
    collect exercised behavior data using the domain metadescriptor in the specific context triggered by the matrix execution defining a second set of values;
    cluster the first and second sets of values into respective clusters using a machine learning hierarchical clustering algorithm; and
    compute a deviation between the initial behavior data and the exercised behavior data based on the respective clusters.

10. The computing device of claim 9, wherein computing the deviation comprises computing an asymmetrical difference between the respective clusters.

11. The computing device of claim 9, wherein computing the deviation comprises computing a union of the respective clusters minus an intersection of the respective clusters.

12. The computing device of claim 9, wherein the initial behavior data and the exercised behavior data are associated with a service.

13. The computing device of claim 9, wherein the initial behavior data and the exercised behavior data are associated with an online service.

14. A computer-implemented method, comprising:
    constructing, via a hardware processor, a domain metadescriptor;
    constructing, via the hardware processor, a matrix execution to place the domain metadescriptor in a specific context;
    collecting, via the hardware processor, initial behavior data using the domain metadescriptor in the specific context triggered by the matrix execution defining a first set of values;
    collecting, via the hardware processor, exercised behavior data using the domain metadescriptor in the specific context triggered by the matrix execution defining a second set of values;
    clustering, via the hardware processor, the first and second sets of values into respective clusters using a machine learning hierarchical clustering algorithm; and
    computing, via the hardware processor, a deviation between the initial behavior data and the exercised behavior data based on the respective clusters.

* * * * *